(12) United States Patent
Magnuski et al.

(10) Patent No.: US 11,861,598 B2
(45) Date of Patent: Jan. 2, 2024

(54) APPARATUSES AND METHODS FOR CALCULATING FOREIGN EXCHANGE ADVANTAGES

(71) Applicant: Acceleron Bank, Inc., Charlestown, MA (US)

(72) Inventors: Damon Magnuski, Newton, MA (US); Matthew Henkler, Chicago, IL (US); Kevin Minard, Dillon, CO (US); Andrew Dillard, View Park, CA (US)

(73) Assignee: Acceleron Bank, Inc.

( * ) Notice: Subject to any disclaimer, the term of this patent is extended or adjusted under 35 U.S.C. 154(b) by 0 days.

(21) Appl. No.: 18/112,394

(22) Filed: Feb. 21, 2023

(65) Prior Publication Data
US 2023/0267453 A1 Aug. 24, 2023

Related U.S. Application Data

(60) Provisional application No. 63/312,155, filed on Feb. 21, 2022.

(51) Int. Cl.
*G06Q 20/38* (2012.01)
(52) U.S. Cl.
CPC .................................. *G06Q 20/381* (2013.01)
(58) Field of Classification Search
CPC .................................................... G06Q 20/381
USPC .......................................................... 705/39
See application file for complete search history.

(56) References Cited

U.S. PATENT DOCUMENTS 11,080,688 B1 * 8/2021 Corrigan ............... G07F 19/211
11,182,776 B1 * 11/2021 Bhos .................... G06Q 20/381
2013/0185186 A1 * 7/2013 Blackwood ............ G06Q 20/10 705/37
2014/0358763 A1 * 12/2014 Grovit .................... G06Q 20/04 705/37
2015/0012409 A1 * 1/2015 Toft ...................... G06Q 20/381 705/37
2017/0017948 A1 * 1/2017 Shyu ...................... G06Q 20/10
2017/0148015 A1 * 5/2017 Edgington ........... G06Q 20/405
2017/0213219 A1 * 7/2017 Garden .............. G06Q 20/4016
(Continued)

FOREIGN PATENT DOCUMENTS

WO WO-2022046123 A1 * 3/2022

OTHER PUBLICATIONS

"Optimal classification trees," by Dimitris Bertsimas and Jack Dunn. Machine Learning 106 (2017): pp. 1039-1082. (Year: 2017).*

*Primary Examiner* — Sara C Hamilton
(74) *Attorney, Agent, or Firm* — Caldwell Intellectual Property Law

(57) ABSTRACT

An apparatus and method for calculating foreign exchange advantages, the apparatus includes at least a processor and a memory containing instructions configuring the at least a processor to acquire action data from an entity, wherein an element of the action data includes at least a plurality of originators and at least a plurality of receivers, process the action data, wherein processing the action data includes classifying a plurality of action data elements to at least an originator of the plurality of originators and a receiver of the plurality of receivers and classifying the action data against a data store including at least a foreign exchange rate, generate a conversion record as a function of the processed action data, and output the conversion record to a third-party computing device.

18 Claims, 7 Drawing Sheets

(56) References Cited

U.S. PATENT DOCUMENTS

| | | | |
|---|---|---|---|
| 2018/0005320 A1* | 1/2018 | Huang | G06Q 20/3223 |
| 2019/0139021 A1* | 5/2019 | Madeira Da Silva | G06Q 20/3224 |
| 2019/0139022 A1* | 5/2019 | Madeira Da Silva | G06Q 20/383 |
| 2020/0286170 A1* | 9/2020 | Kramer | G06Q 40/02 |
| 2020/0327539 A1* | 10/2020 | Andrew | G06Q 20/023 |
| 2020/0334738 A1* | 10/2020 | Dixit | G06Q 20/3827 |
| 2021/0019738 A1* | 1/2021 | Koppelman | G06Q 20/42 |
| 2021/0035211 A1* | 2/2021 | Kapoor | G06Q 30/0185 |
| 2021/0158339 A1* | 5/2021 | Tollo | G06Q 20/401 |
| 2021/0366043 A1* | 11/2021 | Choi | G06Q 20/381 |
| 2022/0180458 A1* | 6/2022 | Tax | G06Q 20/381 |
| 2023/0130845 A1* | 4/2023 | Mochan | G06Q 20/027 705/42 |

\* cited by examiner

APPARATUSES AND METHODS FOR CALCULATING FOREIGN EXCHANGE ADVANTAGES

CROSS-REFERENCE TO RELATED APPLICATIONS

This application claims the benefit of priority of U.S. Provisional Patent Application Ser. No. 63/312,155, filed on Feb. 21, 2022, and titled "APPARATUS AND METHODS FOR CALCULATING FOREIGN EXCHANGE ADVANTAGES," which is incorporated by reference herein in its entirety.

FIELD OF THE INVENTION

The present invention generally relates to the field of foreign exchanges. In particular, the present invention is directed to apparatuses and methods for calculating foreign exchange advantages.

BACKGROUND

Most cross-border payments are processed in ways non-advantageous to consumers. Consumers lack proper resources to determine the advantages in exchanging currency before conducting cross-border payments.

SUMMARY OF THE DISCLOSURE

In an aspect, an apparatus for calculating foreign exchange advantages is illustrated. The apparatus includes at least a processor and a memory communicatively connected to the processor, the memory containing instructions configuring the at least a processor to acquire action data from an entity, wherein an element of the action data includes at least a plurality of originators and at least a plurality of receivers, process the action data, wherein processing the action data includes classifying a plurality of action data elements to at least an originator of the plurality of originators and a receiver of the plurality of receivers and classifying the action data against a data store including at least a foreign exchange rate, generate a conversion record as a function of the processed action data, and output the conversion record to a third-party computing device.

In another aspect, a method for calculating foreign exchange advantages is illustrated. The method includes acquiring, by at least a processor, action data from an entity, wherein an element of the action data includes at least a plurality of originators and at least a plurality of receivers, processing, by the at least a processor, the action data, wherein processing the action data includes classifying a plurality of action data elements to at least an originator of the plurality of originators and a receiver of the plurality of receivers and classifying the action data against a data store including at least a foreign exchange rate, generating, by the at least a processor, a conversion record as a function of the processed action data, and outputting, by the at least a processor, the conversion record to a third-party computing device.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for processing foreign exchanges. In an embodiment, processing foreign exchanges includes calculating the advantages of a consumer exchanging currency prior to international payments. Apparatuses and methods may be used on the behalf of financial institutions globally to encourage consumers to convert currency cross-border payments into foreign exchanges by showing cost savings.

Aspects of the present disclosure can be used by financial institutions to see additional revenue when consumers choose foreign exchange. Exemplary embodiments illustrating aspects of the present disclosure are described below in the context of several specific examples.

Figure 1:
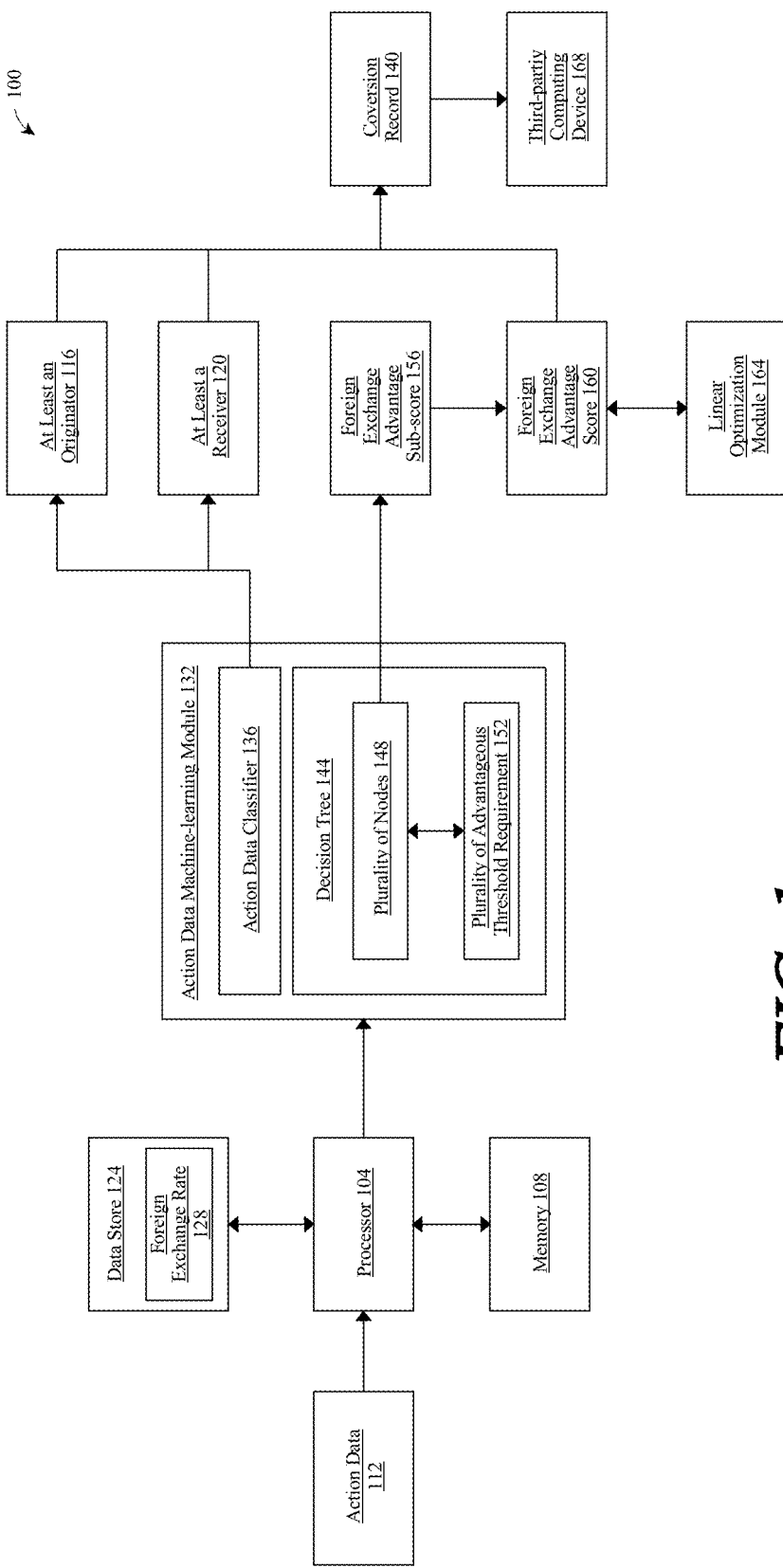
FIG. 1 is a block diagram of an apparatus for calculating foreign exchange advantages.

Referring now to FIG. 1, an exemplary embodiment of an apparatus 100 for calculating foreign exchange advantages is illustrated. Apparatus 100 includes at least a processor 104 and a memory communicatively connected to the at least a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, memory 108 includes instructions configuring at least a processor 104 to perform any processing step described in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, and without limitation, via a bus or other facility for intercommunication between elements of a computing device. Communicative connecting may also include indirect connections via, for example and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, apparatus 100 and/or computing device may perform determinations, classification, and/or analysis steps, methods, processes, or the like as described in this disclosure using machine learning processes. A "machine learning process," as used in this disclosure, is a process that automatedly uses a body of data known as "training data" and/or a "training set" (described further below) to generate an algorithm that will be performed by a computing device/module to produce outputs given data provided as inputs; this is in contrast to a non-machine learning software program where the commands to be executed are determined in advance by a user and written in a programming language. Machine-learning process may utilize supervised, unsupervised, lazy-learning processes and/or neural networks, described further below.

With continued reference to FIG. 1, in an embodiment, apparatus 100 and methods described herein may perform or implement one or more aspects of a cryptographic system. In one embodiment, a cryptographic system is a system that converts data from a first form, known as "plaintext," which is intelligible when viewed in its intended format, into a second form, known as "ciphertext," which is not intelligible when viewed in the same way. Ciphertext may be unintelligible in any format unless first converted back to plaintext. In one embodiment, a process of converting plaintext into ciphertext is known as "encryption." Encryption process may involve the use of a datum, known as an "encryption key," to alter plaintext. Cryptographic system may also convert ciphertext back into plaintext, which is a process known as "decryption." Decryption process may involve the use of a datum, known as a "decryption key," to return the ciphertext to its original plaintext form. In embodiments of cryptographic systems that are "symmetric," decryption key is essentially the same as encryption key: possession of either key makes it possible to deduce the other key quickly without further secret knowledge. Encryption and decryption keys in symmetric cryptographic systems may be kept secret and shared only with persons or entities that the user of the cryptographic system wishes to be able to decrypt the ciphertext. One example of a symmetric cryptographic system is the Advanced Encryption Standard ("AES"), which arranges plaintext into matrices and then modifies the matrices through repeated permutations and arithmetic operations with an encryption key.

Still referring to FIG. 1, in embodiments of cryptographic systems that are "asymmetric," either encryption or decryption key cannot be readily deduced without additional secret knowledge, even given the possession of a corresponding decryption or encryption key, respectively; a common example is a "public key cryptographic system," in which possession of the encryption key does not make it practically feasible to deduce the decryption key, so that the encryption key may safely be made available to the public. An example of a public key cryptographic system is RSA, in which an encryption key involves the use of numbers that are products of very large prime numbers, but a decryption key involves the use of those very large prime numbers, such that deducing the decryption key from the encryption key requires the practically infeasible task of computing the prime factors of a number which is the product of two very large prime numbers. Another example is elliptic curve cryptography, which relies on the fact that given two points P and Q on an elliptic curve over a finite field, and a definition for addition where A+B=−R, the point where a line connecting point A and point B intersects the elliptic curve, where "0," the identity, is a point at infinity in a projective plane containing the elliptic curve, finding a number k such that adding P to itself k times results in Q is computationally impractical, given correctly selected elliptic curve, finite field, and P and Q.

With continued reference to FIG. 1, in some embodiments, apparatus 100 and methods described herein produce cryptographic hashes, also referred to by the equivalent shorthand term "hashes." A cryptographic hash, as used herein, is a mathematical representation of a lot of data, such as files or blocks in a block chain as described in further detail below; the mathematical representation is produced by a lossy "one-way" algorithm known as a "hashing algorithm." Hashing algorithm may be a repeatable process; that is, identical lots of data may produce identical hashes each time they are subjected to a particular hashing algorithm. Because hashing algorithm is a one-way function, it may be impossible to reconstruct a lot of data from a hash produced from the lot of data using the hashing algorithm. In the case of some hashing algorithms, reconstructing the full lot of data from the corresponding hash using a partial set of data from the full lot of data may be possible only by repeatedly guessing at the remaining data and repeating the hashing algorithm; it is thus computationally difficult if not infeasible for a single computer to produce the lot of data, as the statistical likelihood of correctly guessing the missing data may be extremely low. However, the statistical likelihood of a computer of a set of computers simultaneously attempting to guess the missing data within a useful timeframe may be higher, permitting mining protocols as described in further detail below.

Still referring to FIG. 1, in an embodiment, hashing algorithm may demonstrate an "avalanche effect," whereby even extremely small changes to lot of data produce drastically different hashes. This may thwart attempts to avoid the computational work necessary to recreate a hash by simply inserting a fraudulent datum in data lot, enabling the use of hashing algorithms for "tamper-proofing" data such as data contained in an immutable ledger as described in further detail below. This avalanche or "cascade" effect may be evinced by various hashing processes; persons skilled in the art, upon reading the entirety of this disclosure, will be aware of various suitable hashing algorithms for purposes described herein. Verification of a hash corresponding to a lot of data may be performed by running the lot of data through a hashing algorithm used to produce the hash. Such verification may be computationally expensive, albeit feasible, potentially adding up to significant processing delays where repeated hashing, or hashing of large quantities of data, is required, for instance as described in further detail below. Examples of hashing programs include, without limitation, SHA256, a NIST standard; further current and past hashing algorithms include Winternitz hashing algorithms, various generations of Secure Hash Algorithm (including "SHA-1," "SHA-2," and "SHA-3"), "Message Digest" family hashes such as "MD4," "MD5," "MD6," and "RIPEMD," Keccak, "BLAKE" hashes and progeny (e.g., "BLAKE2," "BLAKE-256," "BLAKE-512," and the like), Message Authentication Code ("MAC")-family hash functions such as PMAC, OMAC, VMAC, HMAC, and UMAC, Poly1305-AES, Elliptic Curve Only Hash ("ECOH") and similar hash functions, Fast-Syndrome-based (FSB) hash functions, GOST hash functions, the Grøstl hash function, the HAS-160 hash function, the JH hash function, the RadioGatún hash function, the Skein hash function, the Streebog hash function, the SWIFFT hash function, the Tiger hash function, the Whirlpool hash function, or any hash function that satisfies, at the time of implementation, the requirements that a cryptographic hash be deterministic, infeasible to reverse-hash, infeasible to find collisions, and have the property that small changes to an original message to be hashed will change the resulting hash so extensively that the original hash and the new hash appear uncorrelated to each other. A degree of security of a hash function in practice may depend both on the hash function itself and on characteristics of the message and/or digest used in the hash function. For example, where a message is random, for a hash function that fulfills collision-resistance requirements, a brute-force or "birthday attack" may to detect collision may be on the order of $O(2^{n/2})$ for n output bits; thus, it may take on the order of $2^{256}$ operations to locate a collision in a 512 bit output "Dictionary" attacks on hashes likely to have been generated from a non-random original text can have a lower computational complexity, because the space of entries they are guessing is far smaller than the space containing all random permutations of bits. However, the space of possible messages may be augmented by increasing the length or potential length of a possible message, or by implementing a protocol whereby one or more randomly selected strings or sets of data are added to the message, rendering a dictionary attack significantly less effective.

With continued reference to FIG. 1, embodiments described in this disclosure may perform secure proofs. A "secure proof," as used in this disclosure, is a protocol whereby an output is generated that demonstrates possession of a secret, such as device-specific secret, without demonstrating the entirety of the device-specific secret; in other words, a secure proof by itself, is insufficient to reconstruct the entire device-specific secret, enabling the production of at least another secure proof using at least a device-specific secret. A secure proof may be referred to as a "proof of possession" or "proof of knowledge" of a secret. Where at least a device-specific secret is a plurality of secrets, such as a plurality of challenge-response pairs, a secure proof may include an output that reveals the entirety of one of the plurality of secrets, but not all of the plurality of secrets; for instance, secure proof may be a response contained in one challenge-response pair. In an embodiment, proof may not be secure; in other words, proof may include a one-time revelation of at least a device-specific secret, for instance as used in a single challenge-response exchange.

Still referring to FIG. 1, secure proof may include a zero-knowledge proof, which may provide an output demonstrating possession of a secret while revealing none of the secret to a recipient of the output; zero-knowledge proof may be information-theoretically secure, meaning that an entity with infinite computing power would be unable to determine secret from output. Alternatively, zero-knowledge proof may be computationally secure, meaning that determination of secret from output is computationally infeasible, for instance to the same extent that determination of a private key from a public key in a public key cryptographic system is computationally infeasible. Zero-knowledge proof algorithms may generally include a set of two algorithms, a prover algorithm, or "P," which is used to prove computational integrity and/or possession of a secret, and a verifier algorithm, or "V" whereby a party may check the validity of P. Zero-knowledge proof may include an interactive zero-knowledge proof, wherein a party verifying the proof must directly interact with the proving party; for instance, the verifying and proving parties may be required to be online, or connected to the same network as each other, at the same time. Interactive zero-knowledge proof may include a "proof of knowledge" proof, such as a Schnorr algorithm for proof on knowledge of a discrete logarithm. in a Schnorr algorithm, a prover commits to a randomness r, generates a message based on r, and generates a message adding r to a challenge c multiplied by a discrete logarithm that the prover is able to calculate; verification is performed by the verifier who produced c by exponentiation, thus checking the validity of the discrete logarithm. Interactive zero-knowledge proofs may alternatively or additionally include sigma protocols. Persons skilled in the art, upon reviewing the entirety of this disclosure, will be aware of various alternative interactive zero-knowledge proofs that may be implemented consistently with this disclosure.

Alternatively, and continuing to refer to FIG. 1, zero-knowledge proof may include a non-interactive zero-knowledge, proof, or a proof wherein neither party to the proof interacts with the other party to the proof; for instance, each of a party receiving the proof and a party providing the proof may receive a reference datum which the party providing the proof may modify or otherwise use to perform the proof. As a non-limiting example, zero-knowledge proof may include a succinct non-interactive arguments of knowledge (ZK-SNARKS) proof, wherein a "trusted setup" process creates proof and verification keys using secret (and subsequently discarded) information encoded using a public key cryptographic system, a prover runs a proving algorithm using the proving key and secret information available to the prover, and a verifier checks the proof using the verification key; public key cryptographic system may include RSA, elliptic curve cryptography, ElGamal, or any other suitable public key cryptographic system. Generation of trusted setup may be performed using a secure multiparty computation so that no one party has control of the totality of the secret information used in the trusted setup; as a result, if any one party generating the trusted setup is trustworthy, the secret information may be unrecoverable by malicious parties. As another non-limiting example, non-interactive zero-knowledge proof may include a Succinct Transparent Arguments of Knowledge (ZK-STARKS) zero-knowledge proof. In an embodiment, a ZK-STARKS proof includes a Merkle root of a Merkle tree representing evaluation of a secret computation at some number of points, which may be 1 billion points, plus Merkle branches representing evaluations at a set of randomly selected points of the number of points; verification may include determining that Merkle branches provided match the Merkle root, and that point verifications at those branches represent valid values, where validity is shown by demonstrating that all values belong to the same polynomial created by transforming the secret computation. In an embodiment, ZK-STARKS does not require a trusted setup.

Further referring to FIG. 1, zero-knowledge proof may include any other suitable zero-knowledge proof. Zero-knowledge proof may include, without limitation, bulletproofs. Zero-knowledge proof may include a homomorphic public-key cryptography (hPKC)-based proof. Zero-knowledge proof may include a discrete logarithmic problem (DLP) proof. Zero-knowledge proof may include a secure multi-party computation (MPC) proof. Zero-knowledge proof may include, without limitation, an incrementally verifiable computation (IVC). Zero-knowledge proof may include an interactive oracle proof (IOP). Zero-knowledge proof may include a proof based on the probabilistically checkable proof (PCP) theorem, including a linear PCP (LPCP) proof. Persons skilled in the art, upon reviewing the entirety of this disclosure, will be aware of various forms of zero-knowledge proofs that may be used, singly or in combination, consistently with this disclosure.

With continued reference to FIG. 1, in an embodiment, secure proof is implemented using a challenge-response protocol. In an embodiment, this may function as a one-time pad implementation; for instance, a manufacturer or other trusted party may record a series of outputs ("responses") produced by a device possessing secret information, given a series of corresponding inputs ("challenges"), and store them securely. In an embodiment, a challenge-response protocol may be combined with key generation. A single key may be used in one or more digital signatures as described in further detail below, such as signatures used to receive and/or transfer possession of crypto-currency assets; the key may be discarded for future use after a set period of time. In an embodiment, varied inputs include variations in local physical parameters, such as fluctuations in local electromagnetic fields, radiation, temperature, and the like, such that an almost limitless variety of private keys may be so generated. Secure proof may include encryption of a challenge to produce the response, indicating possession of a secret key. Encryption may be performed using a private key of a public key cryptographic system or using a private key of a symmetric cryptographic system; for instance, trusted party may verify response by decrypting an encryption of challenge or of another datum using either a symmetric or public-key cryptographic system, verifying that a stored key matches the key used for encryption as a function of at least a device-specific secret. Keys may be generated by random variation in selection of prime numbers, for instance for the purposes of a cryptographic system such as RSA that relies prime factoring difficulty. Keys may be generated by randomized selection of parameters for a seed in a cryptographic system, such as elliptic curve cryptography, which is generated from a seed. Keys may be used to generate exponents for a cryptographic system such as Diffie-Helman or ElGamal that are based on the discrete logarithm problem.

With continued reference to FIG. 1, embodiments described in this disclosure may utilize, evaluate, and/or generate digital signatures. A "digital signature," as used herein, includes a secure proof of possession of a secret by a signing device, as performed on provided element of data, known as a "message." A message may include an encrypted mathematical representation of a file or other set of data using the private key of a public key cryptographic system. Secure proof may include any form of secure proof as described above, including without limitation encryption using a private key of a public key cryptographic system as described above. Signature may be verified using a verification datum suitable for verification of a secure proof; for instance, where secure proof is enacted by encrypting message using a private key of a public key cryptographic system, verification may include decrypting the encrypted message using the corresponding public key and comparing the decrypted representation to a purported match that was not encrypted; if the signature protocol is well-designed and implemented correctly, this means the ability to create the digital signature is equivalent to possession of the private decryption key and/or device-specific secret. Likewise, if a message making up a mathematical representation of file is well-designed and implemented correctly, any alteration of the file may result in a mismatch with the digital signature; the mathematical representation may be produced using an alteration-sensitive, reliably reproducible algorithm, such as a hashing algorithm as described above. A mathematical representation to which the signature may be compared may be included with signature, for verification purposes; in other embodiments, the algorithm used to produce the mathematical representation may be publicly available, permitting the easy reproduction of the mathematical representation corresponding to any file.

With continued reference to FIG. 1, in some embodiments, digital signatures may be combined with or incorporated in digital certificates. In one embodiment, a digital certificate is a file that conveys information and links the conveyed information to a "certificate authority" that is the issuer of a public key in a public key cryptographic system. Certificate authority in some embodiments contains data conveying the certificate authority's authorization for the recipient to perform a task. The authorization may be the authorization to access a given datum. The authorization may be the authorization to access a given process. In some embodiments, the certificate may identify the certificate authority. The digital certificate may include a digital signature.

With continued reference to FIG. 1, in some embodiments, a third party such as a certificate authority (CA) is available to verify that the possessor of the private key is a particular entity; thus, if the certificate authority may be trusted, and the private key has not been stolen, the ability of an entity to produce a digital signature confirms the identity of the entity and links the file to the entity in a verifiable way. Digital signature may be incorporated in a digital certificate, which is a document authenticating the entity possessing the private key by authority of the issuing certificate authority and signed with a digital signature created with that private key and a mathematical representation of the remainder of the certificate. In other embodiments, digital signature is verified by comparing the digital signature to one known to have been created by the entity that purportedly signed the digital signature; for instance, if the public key that decrypts the known signature also decrypts the digital signature, the digital signature may be considered verified. Digital signature may also be used to verify that the file has not been altered since the formation of the digital signature.

With continued reference to FIG. 1, processor 104 is configured to acquire action data 112 from an entity. As used in this disclosure, to "acquire" means to collect, gather, or otherwise receive data. As used in this disclosure, "action data" is information pertaining to transaction processing hosted by the entity. In some cases, transactions may include, without limitation, payments, purchases, collections, transfers, and the like thereof. In some embodiments, action data 112 may include any information related to domestic transaction processing hosted by the entity. In other embodiments, action data 112 may include any information related to international transaction processing hosted by the entity. As used in this disclosure, an "entity" is an independent and distinct existence such as a legal person. In some cases, legal person may include, without limitation, individual, group of individuals, trust, foundation, partnership, limited partnership, corporation, other business entity or firm, or the like thereof. In other cases, legal person may further include government such as, without limitation, municipality, state government, provincial government, departmental government, national or federal government, quasi-governmental organization, and/or the like thereof. In some embodiments, entity may include one or more sub-entities such as, without limitation, departments or divisions of entities listed above. In a non-limiting example, entity may include a bank or any type of financial institution for the purposes of processing foreign exchange of currency. An element of action data 112 includes at least a plurality of originators and at least a plurality of receivers. An "originator," for the purposes of this disclosure, is an entity which initiates a transaction. For example, and without limitation, originator may include a person who seeks to make a cross-border payment. As used in this disclosure, a "cross-border payment" is a financial transaction where the originator and the receiver are based in separate countries or different currency unions. A "receiver," as described herein, is an entity which accepts the transaction. For example, and without limitation, receiver may include is a person receiving the cross-border payment, such as a beneficiary. In a non-limiting example, originators within action data 112 may be clients of a bank or financial institution attempting to make an international payment, while receivers within action data 112 may be the beneficiary of the international payment. Additionally, or alternatively, other elements of action data 112 may include, originator's and receiver's banking information, geographic location of both parties, identification documents (e.g., driver's license, taxpayer identification number, social security number, employer identification number, and the like), currency amount to be transferred, addresses, and any other kind of information one skilled in the art would understand as appropriate and/necessary to acquire for transaction purposes. Further, processor 104 may be configured to acquire action data 112 through a network, being any described throughout this disclosure, that processor 104 is communicatively connected to. For example, and without limitation, entity may use any network interface device described throughout this disclosure to upload action data 112 that processor 104 may then receive and process. For another example, and without limitation, action data 112 may be received by processor 104 through a chatbot as described in further detail in reference to FIG. 3.

With continued reference to FIG. 1, processor 104 is configured to process the action data 112. In some embodiments, processing action data 112 may include classifying a plurality of action data elements to at least an originator 116 of the plurality of originators and a receiver 120 of the plurality of receivers. As used in this disclosure, an "action data element" is a unit of action data. For example, and without limitation, action data element may include a single transaction involving an originator and a receiver. For another example, and without limitation, action data element may include a bank statement. In some embodiments, classifying the plurality of action data elements may include dividing the plurality of action data elements into groups such as, without limitation, originator elements group and receiver elements group. As used in this disclosure, an "originator elements group" is a set of one or more action data elements that related to one or more originators. As used in this disclosure, an "receiver elements group" is a set of one or more action data elements that related to one or more receivers. In a non-limiting example, each entry of originator elements group may include information related to a at least an originator 116 and each entry of receiver elements group may include information related to at least a receiver 120. Classifying the plurality of action data elements may include matching elements of action data 112 related to at least an originator and/or at least a receiver. Processor 104 may be configured to output a plurality of data bins based on the match. A "data bin" is a collection of data, such as without limitation, action data 112, wherein the data within the data bin shared one or more data attributes, such as without limitation, elements of action data 112. Data bin may be hashed using one or more hashing algorithms as described above. Each data bin of plurality of data bins may include, without limitation, a particular originator or receiver associated with a particular geographic location and banking information. In other embodiments, processing action data 112 may further include classifying the action data against a data store 124 including at least a foreign exchange rate 128 as described in further detail below. A "data store," for the purpose of this disclosure, is a repository for persistently storing and/or managing collections of data. In some cases, data store 124 may include foreign exchange rates for a plurality of countries, conversion requirements, and payment terms of countries, and the like. As used in this disclosure, a "foreign exchange rate" is a relative value or price of one currency expressed in terms of another currency (or group of currencies). Continuing the non-limiting example, data bins output by processor 104 may also include categorization of foreign exchange rule, terms, regulations and the like pertaining to at least an originator 116 and at least a receiver 120; for instance, and without limitation, data bin for an originator attempting to transfer money from the United States to France may include the conversion rates for U.S. dollars to euros, costs of sending dollars to France and then converting vs. potential savings if dollars are exchanged for euros prior to transfer, and the like.

With further reference to FIG. 1, any data processed and/or used as described in this disclosure, including any action data and/or other data used in processes herein, may be associated with one or more elements of metadata. "Metadata," as used in this disclosure, is data that describes other data, including without limitation action data or any data usable to match action data and/or action data items to originators, receivers, or the like. Metadata may include, without limitation, a time and/or timestamp of data creation, risk scoring of data, preferred currency for a data account, a census tract, or the like. A timestamp included in metadata may include, without limitation, a timestamp of data creation, a timestamp representing a time at which an element of data was cryptographically hashed and/or included in a cryptographic accumulator, a timestamp representing a time at which such hash and/or cryptographic accumulator was entered into a database, or a timestamp representing any other time of any occurrence, action, or step described in this disclosure. A timestamp may include, without limitation, a timestamp, which may include a secure timestamp, and/or a datum linked to a secure timestamp, such as a cryptographic hash of the secure timestamp or the like. As used herein, a "secure timestamp" is an element of data that immutably and verifiably records a particular time, for instance by incorporating a secure proof, cryptographic hash, or other process whereby a party that attempts to modify the time and/or date of the secure timestamp will be unable to do so without the alteration being detected as fraudulent.

Still referring to FIG. 1, a secure timestamp may record a current time in a hash chain. In an embodiment, a hash chain includes a series of hashes, each produced from a message containing a current time stamp (i.e., current at the moment the hash is created) and the previously created hash, which may be combined with one or more additional data; additional data may include a random number, which may be generated for instance using any random or pseudorandom number generator. Additional data may include one or more additional data, that are received, generated, identified, and/or determined by any processor and/or any computing device described in this disclosure. Additional data may be hashed into a Merkle tree or other hash tree, or otherwise included in any cryptographic accumulator, such that a root of the hash tree and/or root or other portion of the cryptographic accumulator may be incorporated in an entry in hash chain. It may be computationally infeasible to reverse hash any one entry, particularly in the amount of time during which its currency is important; it may be astronomically difficult to reverse hash the entire chain, rendering illegitimate or fraudulent timestamps referring to the hash chain all but impossible. A purported entry may be evaluated by hashing its corresponding message. In an embodiment, the trusted timestamping procedure utilized is substantially similar to the RFC 3161 standard. In this scenario, the received data signals are locally processed at the listener device by a one-way function, e.g. a hash function, and this hashed output data is sent to a timestamping authority (TSA). The use of secure timestamps as described herein may enable systems and methods as described herein to instantiate attested time. Attested time is the property that a device incorporating a local reference clock may hash data, including without limitation any data described in this disclosure, along with the local timestamp of the device. Attested time may additionally incorporate attested identity, attested device architecture and other pieces of information identifying properties of the attesting device. In one embodiment, secure timestamp is generated by a trusted third party (TTP) that appends a timestamp to the hashed output data, applies the TSA private key to sign the hashed output data concatenated to the timestamp, and returns this signed, a.k.a. trusted timestamped data back to the listener device. Alternatively, or additionally, one or more additional participants, such as other verifying nodes, may evaluate secure timestamp, or other party generating secure timestamp and/or perform threshold cryptography with a plurality of such parties, each of which may have performed an embodiment of method to produce a secure timestamp. In an embodiment, parties authenticating digitally signed assertions, devices, and/or user credentials may perform authentication at least in part by evaluating timeliness of entry and/or generation data as assessed against secure timestamp. In an embodiment, secure proof is generated using an attested computing protocol; this may be performed, as a non-limiting example, using any protocol for attested computing as described above.

Further referring to FIG. 1, metadata may be associated with data described thereby in any manner described in this disclosure, including without limitation by inclusion in a data record linking to and/or also including such data, combination therewith in a cryptographic accumulator, and/or any other data link indicating an association between data and metadata.

In some embodiments, and still referring to FIG. 1, any data and/or metadata processed and/or used as described in this disclosure, including any action data, action data items, and/or other data used in processes herein, may be cryptographically hashed and/or included in a cryptographic accumulator; the digest, accumulator, and/or any part of accumulator including without limitation a root of accumulator, may be stored in database, linked to corresponding data or metadata, or the like. Any classification of any data and/or metadata to any other data and/or metadata may include classification of hashes and/or cryptographic accumulators to each other and/or to such data; for instance and without limitation, classification may include comparison of hashes to identify relationships and/or similarities between one datum and/or lot of data and another. As a further non-limiting example, proofs of membership in cryptographic accumulators may be used to identify data records matching a user, transaction amount, or the like to another, previously recorded user, transaction amount, or the like. As a non-limiting illustrative example, a user, whose identity may be stored in a hashed or cryptographically accumulated form, may be recorded as performing a first transaction having a first amount, such as for instance $1000 on a first day, and then maybe recorded, so identified, as having performed a second transaction in a second amount, such as $1,000,000 on another day. System and/or apparatus may compare such transactions, as linked together by common hashed and/or accumulated user identities. Where transaction amounts differ by more than a preconfigured threshold amount, apparatus may generate an alert indicating potential fraud or other anomalies. Preconfigured threshold may include a statistical measure of all previous transactions, such as without limitation an average or mean transaction amount by a user. Alternatively or additionally, a machine-learning model may be trained using training data that associates transaction pairs or sequences with user-entered labels indicating likelihood or presence of fraud, money laundering, or other irregularities; such machine-learning model may input pairs and/or sequences of transactions by a given user and output degrees of probability and/or identifications of fraud, money laundering, or other irregularities. Degrees of probability may be compared to preconfigured thresholds, and if above such a threshold may trigger an alert to another user and/or system.

With continued reference to FIG. 1, action data 112, foreign exchange rate 128 and/or any data described in this disclosure may be received and/or stored in data store 124 such as, without a limitation, a database. Data store 124 may be implemented, without limitation, as a relational database, a key-value retrieval database such as a NOSQL database, or any other format or structure for use as a database that a person skilled in the art would recognize as suitable upon review of the entirety of this disclosure. Data store 124 may alternatively or additionally be implemented using a distributed data storage protocol and/or data structure, such as a distributed hash table or the like. Data store 124 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a data store may save, retrieve, organize, and/or reflect data and/or records as used herein, as well as categories and/or populations of data consistently with this disclosure.

With continued reference to FIG. 1, in some embodiments, processing action data 112 may include processing the action data using a machine-learning module, such as action data machine-learning module 132, to implement one or more algorithms or generate one or more machine-learning models, such as action data classifier 136, to classify plurality of action data elements to at least an originator 116 and/or at least a receiver 120. However, the machine learning module is exemplary and may not be necessary to generate one or more machine learning models and perform any machine learning described herein. In one or more embodiments, one or more machine-learning models may be generated using training data. Training data may include inputs and corresponding predetermined outputs so that a machine-learning model may use correlations between the provided exemplary inputs and outputs to develop an algorithm and/or relationship that then allows machine-learning model to determine its own outputs for inputs. Training data may contain correlations that a machine-learning process may use to model relationships between two or more categories of data elements. Exemplary inputs and outputs may come from data store 124 or be provided by the entity. In other embodiments, a machine-learning module may obtain a training set by querying communicatively connected data store 124 that includes past inputs and outputs. Training data may include inputs from various types of data stores, resources, and/or user inputs and outputs correlated to each of those inputs so that a machine-learning model may determine an output. Correlations may indicate causative and/or predictive links between data, which may be modeled as relationships, such as mathematical relationships, by machine-learning models, as described in further detail below. In one or more embodiments, training data may be formatted and/or organized by categories of data elements by, for example, associating data elements with one or more descriptors corresponding to categories of data elements. As a non-limiting example, training data may include data entered in standardized forms by persons or processes, such that entry of a given data element in a given field in a form may be mapped to one or more descriptors of categories. Elements in training data may be linked to descriptors of categories by tags, tokens, or other data elements. Action data machine-learning module 132 may be used to generate action data classifier 136 and/or any other machine learning model described in this disclosure, using training data.

With continued reference to FIG. 1, a "classifier," as used in this disclosure is a machine-learning model, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Processor 104 and/or another device may generate a classifier using a classification algorithm, defined as a processes whereby a processor 104 derives a classifier from training data. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 1, processor 104 may be configured to generate a classifier using a Naïve Bayes classification algorithm. Naïve Bayes classification algorithm generates classifiers by assigning class labels to problem instances, represented as vectors of element values. Class labels are drawn from a finite set. Naïve Bayes classification algorithm may include generating a family of algorithms that assume that the value of a particular element is independent of the value of any other element, given a class variable. Naïve Bayes classification algorithm may be based on Bayes Theorem expressed as P(A/B)=P(B/A) P(A)÷P(B), where P(AB) is the probability of hypothesis A given data B also known as posterior probability; P(B/A) is the probability of data B given that the hypothesis A was true; P(A) is the probability of hypothesis A being true regardless of data also known as prior probability of A; and P(B) is the probability of the data regardless of the hypothesis. A naïve Bayes algorithm may be generated by first transforming training data into a frequency table. Processor 104 may then calculate a likelihood table by calculating probabilities of different data entries and classification labels. Processor 104 may utilize a naïve Bayes equation to calculate a posterior probability for each class. A class containing the highest posterior probability is the outcome of prediction. Naïve Bayes classification algorithm may include a gaussian model that follows a normal distribution. Naïve Bayes classification algorithm may include a multinomial model that is used for discrete counts. Naïve Bayes classification algorithm may include a Bernoulli model that may be utilized when vectors are binary.

With continued reference to FIG. 1, processor 104 may be configured to generate a classifier using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm: $l=\sqrt{\sum_{i=0}^{n} a_i^2}$, where $a_i$ is attribute number i of the vector. Scaling and/or normalization may function to make vector comparison independent of absolute quantities of attributes, while preserving any dependency on similarity of attributes; this may, for instance, be advantageous where cases represented in training data are represented by different quantities of samples, which may result in proportionally equivalent vectors with divergent values.

With continued reference to FIG. 1, in some embodiments, action data classifier 136 may be trained by correlated inputs and outputs of training data. Training data may be data sets that have already been converted from raw data whether manually, by machine, or any other method. Training data may include previous outputs such that action data classifier 136 iteratively produces outputs. Action data classifier 136 using a machine-learning process may output converted data based on input of training data. In an embodiment, processing action data 112 may include classifying plurality of action data elements to at least an originator 116 and at least a receiver 120 and using machine learning model, such as action data classifier 136 generated by action data machine-learning module 132. In a non-limiting example, action data classifier 136 may be trained using action training data, wherein the action training data may include a plurality of action data correlating to a plurality of action data bins. In some embodiments, action training data may include a plurality of action data element sets that are each correlated to one of a plurality of originators. In such embodiments, action training data may be used to show one or more action data elements may indicate a particular originator of the plurality of originators. In other embodiments, action training data may include a plurality of action data element sets that are each correlated to one of a plurality of receivers. In such embodiments, action training data may be used to show one or more action data elements may indicate a particular receiver of the plurality of receivers. Processing action data 112 using action data machine-learning module 132 may further include training action data classifier 136 as a function of action training data. Further, processing action data 112 using action data machine-learning module 132 may also include classifying plurality of action data elements to at least an originator 116 of plurality of originators and at least a receiver 120 of plurality of receivers using trained action data classifier 136.

With continued reference to FIG. 1, processor may be configured to process action data 112 using a language processing module configured to extract one or more elements of action data 112, such as, without limitation, any textual information from action data 112. Language processing module may include any hardware and/or software module. Language processing module may be configured to extract, from the one or more documents, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data as described above. Textual data may be parsed into tokens, which may include a simple word (sequence of letters separated by whitespace) or more generally a sequence of characters as described previously. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language processing module may operate to produce a language processing model. Language processing model may include a program automatically generated by computing device and/or language processing module to produce associations between one or more words extracted from at least a document and detect associations, including without limitation mathematical associations, between such words. Associations between language elements, where language elements include for purposes herein extracted words, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of semantic meaning. As a further example, statistical correlations and/or mathematical associations may include probabilistic formulas or relationships indicating a positive and/or negative association between at least an extracted word and/or a given semantic meaning; positive or negative indication may include an indication that a given document is or is not indicating a category semantic meaning. Whether a phrase, sentence, word, or other textual element in a document or corpus of documents constitutes a positive or negative indicator may be determined, in an embodiment, by mathematical associations between detected words, comparisons to phrases and/or words indicating positive and/or negative indicators that are stored in memory at computing device, or the like.

With continued reference to FIG. 1, language processing module and/or diagnostic engine may generate the language processing model by any suitable method, including without limitation a natural language processing classification algorithm; language processing model may include a natural language process classification model that enumerates and/or derives statistical relationships between input terms and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted words, phrases, and/or other semantic units. There may be a finite number of categories to which an extracted word may pertain; an HMM inference algorithm, such as the forward-backward algorithm or the Viterbi algorithm, may be used to estimate the most likely discrete state given a word or sequence of words. Language processing module may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

With continued reference to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language processing module may use a corpus of documents to generate associations between language elements in a language processing module, and diagnostic engine may then use such associations to analyze words extracted from one or more documents and determine that the one or more documents indicate significance of a category. In an embodiment, language module and/or processor 104 may perform this analysis using a selected set of significant documents, such as documents identified by one or more experts as representing good information; experts may identify or enter such documents via graphical user interface, or may communicate identities of significant documents according to any other suitable method of electronic communication, or by providing such identity to other persons who may enter such identifications into processor 104. Documents may be entered into a computing device by being uploaded by an expert or other persons using, without limitation, file transfer protocol (FTP) or other suitable methods for transmission and/or upload of documents; alternatively or additionally, where a document is identified by a citation, a uniform resource identifier (URI), uniform resource locator (URL) or other datum permitting unambiguous identification of the document, diagnostic engine may automatically obtain the document using such an identifier, for instance by submitting a request to a database or compendium of documents such as JSTOR as provided by Ithaka Harbors, Inc. of New York.

With continued reference to FIG. 1, processor is configured to generate a conversion record 140 as a function of the processed action data 112. As used in this disclosure, a "conversion record" is information pertaining to an originator exchanging currency prior to transferring currency internationally, such as rate of exchange, potential savings, optimized transfer plans and the like. In some embodiments, conversion record 140 may be presented in a notification format referred to as a "nudge" within this disclosure. In some embodiments, Processor 104 and/or computing device 112 is configured to generate a nudge based on action data 112 meeting a plurality of advantageous threshold requirements 152. In some cases, a nudge may be configured to influence the behavior and decision-making of a receiver of the nudge such as, without limitation, end user as described below; for instance, nudge may include in a form of notification, reminder, and the like thereof. In a non-limiting example, nudge may facilitate end user to initiate a transaction such as, without limitation, submitting a payment instruction, based on the content within conversion record 140 (i.e., information related to at least an originator 116, at least a receiver 120, foreign exchange rate 128, and the like thereof). As used in this disclosure, an "advantageous threshold requirement" is a condition configured to determine a user and/or end user's eligibility for generating and/or receiving conversion record 140. An "end user," as used in this disclosure, is a customer, originator, client, entity, and the like of the user that would carry out the transfer. In a non-limiting example, advantageous threshold requirements may include requirements such as, without limitation, minimum deposit, minimum savings, minimum number of payments, account activity, account status, and the like thereof. Advantageous threshold requirements may be determined manually by the entity. In a non-limiting example, advantageous threshold requirements may be determined by the entity based on its financial advantages, consumer advantages, bank/financial institution advantages, efficiency, reliability, and the like.

In some embodiments, generating conversion record 140 may include constructing, by processor 104, a decision tree 144 as a function of plurality of advantageous threshold requirements 152. In a non-limiting example, processor 104 may map one or more advantageous threshold requirements to each node of plurality of nodes 148 within decision tree 144. In this case, each node of plurality of nodes 148 may include at least one advantageous threshold requirement of plurality of advantageous threshold requirements 152. As used in this disclosure, a "decision tree" is a data structure that represents and combines one or more determinations or other computations based on and/or concerning data provided thereto, as well as earlier such determinations or calculations, as nodes of a tree data structure where inputs of some nodes are connected to outputs of others. As used in this disclosure, a "node" of a tree is an entity which contains a value or data and optionally contains one or more connection to other nodes. Plurality of nodes 148 within decision tree 144 may include at least a root node, or node that receives processed action data 112 to the decision tree 144, such as, without limitation, at least an originator 116, at least a receiver 120, foreign exchange rate 128, any other action data elements and the like thereof. Plurality of nodes 148 within decision tree 144 may include at least a terminal node, which may alternatively or additionally be referred to herein as a "leaf node," corresponding to an execution result of decision tree 144. In other words, decisions and/or determinations produced by decision tree 144 may be output at the at least a terminal node. In a non-limiting example, terminal node may include a foreign exchange advantage sub-score as execution result of decision tree 144. Foreign exchange advantage sub-score disclosed here will be described in further detail below. In some embodiments, plurality of nodes 148 within decision tree 144 may include one or more internal nodes, defined as nodes connecting outputs of root nodes to inputs of terminal nodes. In some cases, processor 104 may generate two or more decision trees 144, which may overlap. In a non-limiting example, decision tree 144 may establish a link to a remote decision module, device, system, or the like. Root node of one decision tree may connect to and/or receive output from one or more terminal nodes of another decision tree, intermediate nodes of one decision tree may be shared with another decision tree, or the like. In some embodiments, decision tree 144 may incorporate plurality of advantageous threshold requirements 152 using an application programming interface (API). In other embodiments, decision tree 144 may perform one or more data store lookups and/or look-up table lookups.

With continued reference to FIG. 1, in some embodiments, constructing decision tree 144 using processor 104 may include constructing decision tree 144 as a function of a decision metric. As used in this disclosure, a "decision metric" is a quantitative measurement for determining one or more branches within decision tree 144 from root node to terminal node of plurality of nodes 148. In a non-limiting example, plurality of nodes 148 within decision tree 144 may be split according to decision metric, wherein resulting branches (i.e., sub-trees) between plurality of nodes may include a better decision metric than previous tree; for instance, a higher probability of one class. As used in this disclosure, a "branch" is a connection between two nodes of decision tree 144. Nodes may include any node described above such as, without limitation, root node, terminal node, internal node, and the like thereof. In some embodiments, branch may include a relation indicator, wherein the relation indicator is an element indicates a single relationship between connected nodes. In some cases, relation indicator may include any data type such as, without limitation, string, integer, Boolean, object, and the like thereof. In a non-limiting example, root node may be connected to a first terminal node through a first branch and a second terminal node through a second branch, wherein the first branch may include a first relation indicator of string "yes" or "satisfied" and the second branch may include a second relation indicator of string "no" or "unsatisfied." In a non-limiting example, decision metric may include an entropy, wherein the entropy is a measurement of randomness in processed action data 112 and measures an amount of uncertainty within processed action data 112. Decision tree 144 with a high entropy as decision metric may include more nodes and branches. In a non-limiting example, decision metric may include a Gini index, wherein the Gini index is a measurement of probability (i.e., likelihood) of a given element of action data 112 misclassified by a particular node of decision tree 144. In a non-limiting example, decision metric may include an information grain (IG), wherein the information gain is a measurement of reduction in entropy or Gini index during the constructing process of decision tree 144. As will be appreciated by persons having ordinary skill in the art, after having read the entirety of this disclosure, the foregoing list is provided by way of example and other metrics for determining branches and/or feature split can be added as an extension or improvements of apparatus 100 disclosed herein.

With continued reference to FIG. 1, in a non-limiting example, processor 104 may be configured to specify a root node within plurality of nodes 148, wherein the root node may be a base advantageous threshold requirement of plurality of advantageous threshold requirements 152. Generating conversion record 140 may further include traversing decision tree 144 based on processed action data 112. Processor 104 may be configured to accept an input such as, without limitation, processed action data 112 and recursively performing mapping of element of processed action data 112 to root node of plurality of nodes 148; for instance, and without limitation, processor may map an entry of bank information of at least an originator 116 and/or at least a receiver 120 to base advantageous threshold requirement of root node 132. In some embodiments, traversing decision tree 144 may include comparing processed action data 112 against at least one advantageous threshold requirement of plurality of advantageous threshold requirements 152 at a first node of plurality of nodes 148 and passing processed action data 112 to a second node of plurality of nodes 148 as a function of the comparison, wherein the second node is connected to the first node. In a non-limiting example, comparing processed action data 112 against one or more advantageous threshold requirements corresponding to the current node may include checking, by processor 104, whether at least a portion of processed action data 112 (i.e., one or more elements of processed action data 112) satisfy the advantageous threshold requirements corresponding to the current node. Root node may be split into a plurality of internal nodes based on a decision metric, wherein the decision metric may be a satisfaction of advantageous threshold requirement; for instance, root node 132 may be connected with a first internal node through a first branch containing a first determination of advantageous threshold requirement satisfaction (i.e., "satisfied") to base advantageous threshold requirement and a second internal node through a second branch containing a second determination of advantageous threshold requirement satisfaction to base advantageous threshold requirement (i.e., "unsatisfied"). First internal node may include a different set of advantageous threshold requirements than second internal node. Processor 104 may connect root node and one or more matched internal nodes with matched decision metric and continue map the next element of processed action data 112. Processor 104 may create a plurality of terminal nodes at the end of recursive input mapping. Each terminal node may be a final advantageous threshold requirement of plurality of advantageous threshold requirements 152. Processor 104 may construct decision tree 144 by enforcing connections/branches between root node and plurality of internal nodes and connections/branches between plurality of internal nodes and plurality of terminal nodes through decision metric. Terminal node may include a final decision regarding to the generation of conversion record 140. In some cases, terminal node may include a last satisfied advantageous threshold requirement; for instance, and without limitation, processor 104 may terminate the construction of decision tree 144 upon an unsatisfied advantageous threshold requirement is reached.

With continued reference to FIG. 1, in some embodiments, traversing decision tree 144 may further include generating a foreign exchange advantage sub-score 156 for each node of the plurality of nodes 148 as a function of each comparison between the action data 112 and at least one of advantageous threshold requirement occurred at each node of the plurality of nodes as described above. As used in this disclosure, a "foreign exchange advantage sub-score" is an evaluation of the extent to which a single advantageous threshold requirement pertaining to a potential transaction between at least an originator 116 and at least a receiver 120 is satisfied. In some embodiments, foreign exchange advantage sub-score 156 may be generated as a numeric value on a scale, percentage, or a linguistic label (e.g., "Poor", "Moderate. "Great", and the like). In some embodiments, advantageous threshold requirements at each node may be represented as a checklist. Processor may match elements of processed action data 112 to each list item (i.e., advantageous threshold requirement) and mark or check the list item upon a successful match, wherein the successful match may be determined based on decision metric as described above. Processor may then generate foreign exchange advantage sub-score 156 as a function of marked or checked list items; for instance, processor 104 may be configured to determine foreign exchange advantage sub-score 156 based on number of checked list items, number of unchecked list items, and the like thereof. Additionally, or alternatively, decision tree 144 may incorporate the use of one or more machine-learning models to form a new data structure. Machine-learning models may include any machine-learning models described in this disclosure. In a non-limiting example, each node of plurality of nodes 148 may include a utilization of a foreign exchange advantage machine-learning model. Foreign exchange advantage machine-leaning model may be trained using a foreign exchange advantage training data, wherein the foreign exchange advantage training data comprises a plurality of advantageous threshold requirements 152 and action data pairs as input correlated to a plurality of foreign exchange advantage sub-scores as output. Foreign exchange advantage training data may be obtained by processor 104 in any manner and/or form as described anywhere in this disclosure, including and without limitation retrieving from data store 124. Processor 104 may generate foreign exchange advantage sub-score 156 at each node as a function of trained foreign exchange advantage machine-learning model. Further, generating the threshold sub-scores may include using a fuzzy set inference system to generate. A fuzzy inferencing system for determination of foreign exchange advantage sub-scores 156 may be employed, where any or all foreign exchange advantage sub-scores 156 may be represented as values and/or fuzzy sets for linguistic variables measuring the same, as described in more detail in FIG. 5. An inferencing system may use one or more fuzzy inferencing rules, as described below in FIG. 5, to output one or more linguistic variable values and/or defuzzified values indicating foreign exchange advantage sub-scores 156.

With continued reference to FIG. 1, generating conversion record 140 may include aggregating plurality of foreign exchange advantage sub-scores 156 associated with plurality of nodes 148 of decision tree 144 into a foreign exchange advantage score 160. As used in this disclosure, a "foreign exchange advantage score" is the aggregation of a plurality of foreign exchange advantage sub-scores 156 generated or determined based on a plurality of advantageous threshold requirements 152 pertaining to a potential transaction between at least an originator 116 and at least a receiver 120. In a non-limiting example, foreign exchange advantage score 160 may include an overall score of plurality of foreign exchange advantage sub-scores 156 generated at each node during decision tree traversal; for instance, and without limitation, foreign exchange advantage score 160 may include an average score of plurality of foreign exchange advantage sub-scores 156. In some embodiments, terminal node of decision tree 144 may incorporate an aggregator, wherein the aggregator is a component configured to receive, collect, or otherwise combine data from a data source such as, without limitation, plurality of nodes 148 of decision tree 144. In a non-limiting example, aggregator may be configured to collect foreign exchange advantage sub-scores 156 from a decision tree traversal path, wherein the decision tree traversal path is an array of nodes visited by processor 104 in order during decision tree traversal as described above. Aggregator may then combine plurality of foreign exchange advantage sub-scores 156 collected from the decision tree traversal path; for instance, and without limitation, aggregator may iteratively or recursively append a first foreign exchange advantage sub-score generated at a current node with a second foreign exchange advantage sub-score generated at a previous node connected with the current node. Further, processor 104 may then generate conversion record 140 as a function of foreign exchange advantage score 160. In some embodiments, foreign exchange advantage score 160 may represent an overall eligibility of the end-user for receiving conversion record 140 as described in further detail below. Foreign exchange advantage score 160 may be used to evaluate if a nudge should or should not be sent out to the end user. In a non-limiting example, processor 104 may be configured to compare foreign exchange advantage score 160 to a threshold score. Processor 104 may generate conversion record 140 if foreign exchange advantage score 160 exceeds the threshold score.

With continued reference to FIG. 1, aggregating plurality of foreign exchange advantage sub-scores 156 into the foreign exchange advantage score 160 may include optimizing the foreign exchange advantage score using a linear optimization module 164. As used in this disclosure, a "linear optimization module" is a component configured to generate optimized data output using linear optimization. A "linear optimization," for the purpose of this disclosure, is a program that optimizes an objective function, given at least a constraint. In a non-limiting example, linear optimization module 164 may generate and/or optimize foreign exchange advantage score 160 using plurality of advantageous threshold requirements 152 as constraints. Linear optimization module 164 may generate an objective function of the plurality of foreign exchange advantage sub-scores. An "objective function," as used in this disclosure, is a mathematical function with a solution set including a plurality of data elements to be compared, such as without limitation plurality of action data elements. Linear optimization module 164 may compute a score, metric, ranking, or the like, associated with each advantageous threshold requirement and select objectives to minimize and/or maximize the score/rank, depending on whether an optimal foreign exchange advantage sub-score 156 or foreign exchange advantage score 160 is represented; an objective function may be used by linear optimization module 164 to score each advantageous threshold requirement. Linear optimization module 164 may select one or more nodes of plurality of nodes 148, or one or more decision tree traversal path that optimizes the objective function. In various embodiments foreign exchange advantage score 160 may be based on a combination of one or more foreign exchange advantage sub-scores 156, including a plurality of constraints like at least an originator 116, at least a receiver 120, transaction dates, receive dates, transaction amount, foreign exchange rate 128, number of transactions, and the like thereof. In some embodiments, plurality of advantageous threshold requirements 152 may be weighted or unweighted.

With continued reference to FIG. 1, in some embodiments, optimizing foreign exchange advantage score 160 may include optimizing of an objective function via a greedy algorithm process, where optimization may be performed by minimizing and/or maximizing an output of objective function through selection of constraints. A "greedy algorithm" is defined as an algorithm that selects locally optimal choices, which may or may not generate a globally optimal solution. For instance, Linear optimization module 164 may select objectives so that foreign exchange advantage sub-score 156 associated therewith are the best score for each node of plurality of nodes 148 of decision tree 144. For instance, in non-limiting illustrative example, optimization may determine the combination of nodes (i.e., decision tree traversal path) such that each node includes the highest foreign exchange advantage sub-score 156 possible, and thus the most optimal foreign exchange advantage score 160. Additionally, or alternatively, processor 104 may determine plurality of action data elements that maximize a foreign exchange advantage score 160 subject to a threshold constraint using linear optimization module 164. For example, processed action data 112 pertaining to an originator's financial savings if currency is converted before international transfer may maximize the foreign exchange advantage score subject to a financial advantage threshold constraint. A mathematical solver may be implemented to solve for processed action data 112 that maximizes scores; mathematical solver may be implemented on processor 104 and/or third-party solver. In a further non-limiting embodiment, objective function may be formulated as nonlinear least squares optimization process. A "nonlinear least squares optimization process," for the purposes of this disclosure, is a form of least squares analysis used to fit a set of m observations with a model that is non-linear in n unknown parameters, where m is greater than or equal to n. The basis of the method is to approximate the model by a linear one and to refine the parameters by successive iterations. A nonlinear least squares optimization process may output a fit of foreign exchange advantage score 120 to plurality of action data elements.

With continued reference to FIG. 1, processor 104 is configured to output the conversion record 140 to a third-party computing device. As used in this disclosure, a "third-party computing device" is any computing device belongs to a third-party platform. As used in this disclosure, a "third-party platform" is a platform hosted by an entity that is involved in an interaction that is primarily between two other entities. In a non-limiting example, third-party platform may include bank/credit union that handles transaction between at least an originator 116 and at least a receiver 120.

Third-party computing device 168 may include a web interface operated by the third-party platform. In some embodiments, end user, and any entity described in this disclosure may have the access to the conversion record 140. In some cases, nudge (i.e., conversion record 140) may include a questionnaire, for example, and without limitation, asking the at least an originator 116 if they would like to convert U.S. currency within the country before any international transfer with at least a receiver 120. Nudge may include a variety of follow up questions about the potential international transfer. Questions may be or may be used to determine plurality of advantageous threshold requirements 152 as described above in this disclosure. In an embodiment, outputting conversion record 140 may include sending the conversion record to end user of the third-party platform computer device using a chatbot, wherein the third-party platform is connected to processor 104 via an API. In such embodiment, end user may include customer, originator, client, or the like of the third-party platform. As used in this disclosure, a "chatbot" is a computer program designed to simulate conversation with one or more entities. Chatbot may be configured to initiate a textual conversation with end user as a function of the third-party computing device. In some cases, chatbot may be used to generate text that is used to interact conversationally with end user. In some cases, end-user may respond to chatbot, by way of a text-based interface, for example without limitation, short message service (SMS) text message. In a non-limiting example, interacting conversationally may additionally include submitting answers to the questions described above, wherein answers may include action data 112. Interacting conversationally may include recognizing at least a word or phrase in action data 112, for instance and without limitation by language processing module used to process action data 112 as described above and recognizing the at least a word as a function of language processing model generated by language processing module. Interacting conversationally may include generating a response as a function of the at least a word; for instance, and without limitation, response may include conversion record 140 generated as a function of processed action data 112.

With continued reference to FIG. 1, additionally, or alternatively, sending conversion record 140 may include creating an end user notification, wherein the end user notification incorporates conversion record 140, and send the end user notification to the end user. As used in this disclosure, an "end-user notification" is a form of communication between chatbot and the end user in which important information is communicated to the end users such as, without limitation, conversion record 140. Important information may include, as a non-limiting example, data generated by processor 104 based on a high foreign exchange advantage score. In some embodiments, chatbot may be configured to opt in and/or opt out for end-user notification containing conversion record 140 based on an end user request, wherein the end user request is a command from the end user that configures chatbot to perform certain action specified in the command. In a non-limiting example, chatbot may initiate an opt-in process as a function of end user request containing information related to an action of "actively subscribe to receive end user notification," wherein the opt-in process may include processor 104 setting a state of consent related to the end user to a true value. Chatbot may initiate an opt-out process as a function of end user request containing information related to an action of "do not receive end user notification," wherein the opt-out process may include processor 104 setting state of consent related to the end user to a false value. Processor 104 may be configured to check the state of consent related to the end user before prior to sending conversion record 140 to the end user; for instance, and without limitation, an end user may receive end user notification if the state of consent of the end user contains true value. End user may not receive end user notification if the state of consent contains false value. Further, sending conversion record 140 may include displaying conversion record 140 through a visual interface. As described in this disclosure, a "visual interface" is a graphical user interface (GUI) that displays any data described above to user of a remote device and permits entity to view, edit, or otherwise interact with displayed content. Visual interface may include a window in which data may be displayed. For example, and without limitation, visual interface may be configured to display conversion record HO in a window. Visual interface may include one or more graphical locator and/or cursor facilities allowing user to interact with conversion record 140 displayed; for instance, and without limitation, using a touchscreen, touchpad, mouse keyboard, and/or other a al data entry device.

Figure 2:
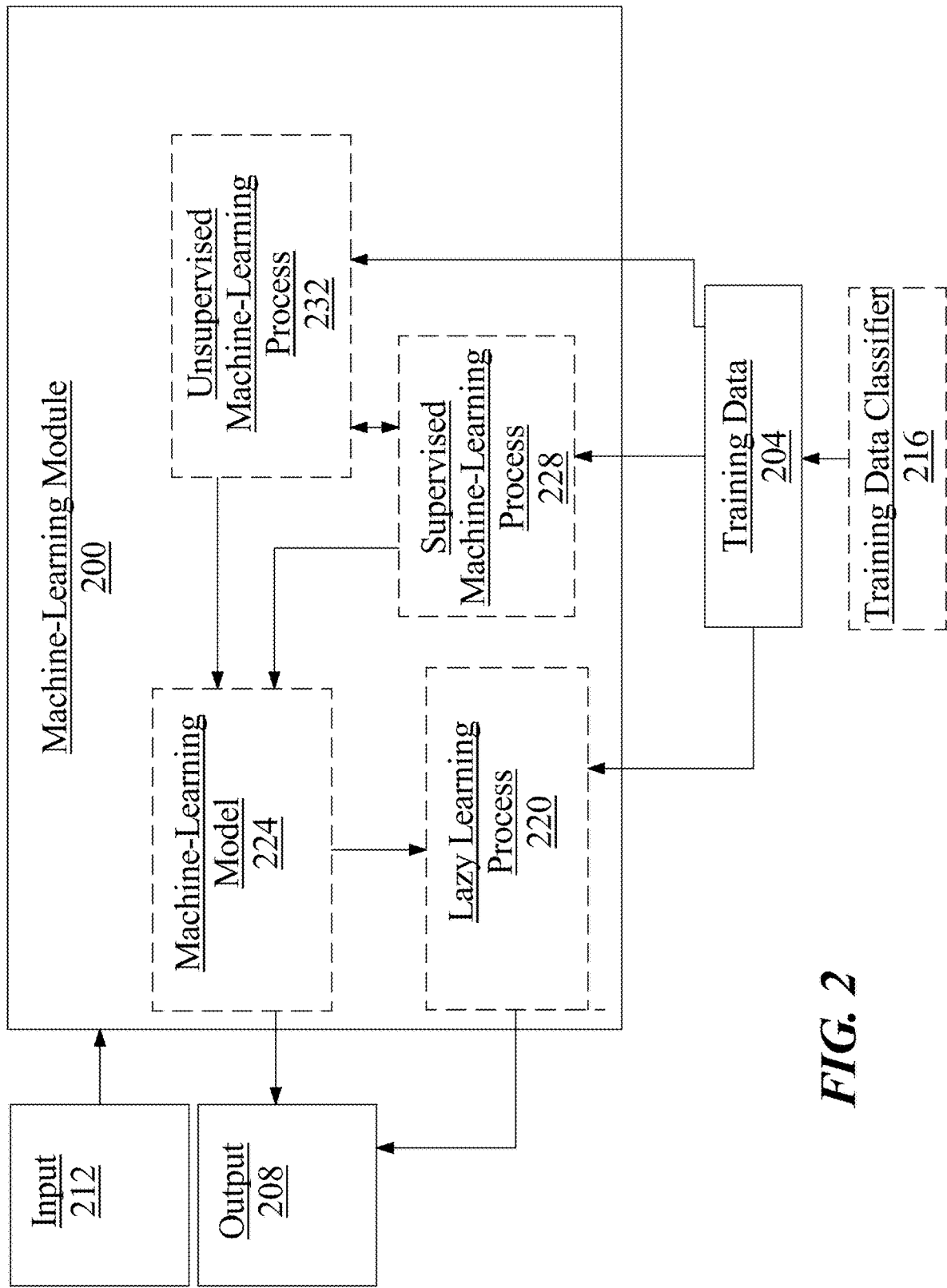
FIG. 2 is a block diagram of exemplary embodiment of a machine learning module.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. "Training data," as used herein, is data containing correlations that a machine-learning process may use to model relationships between two or more categories of data elements. For instance, and without limitation, training data 204 may include a plurality of data entries, each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 2, machine-learning processes as described in this disclosure may be used to generate machine-learning models 224. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include action data 112, and/or plurality of advantageous threshold requirement 152 described above as inputs, foreign exchange advantage sub-score 156 or foreign exchange advantage score 160 described above as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g., a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Figure 3:
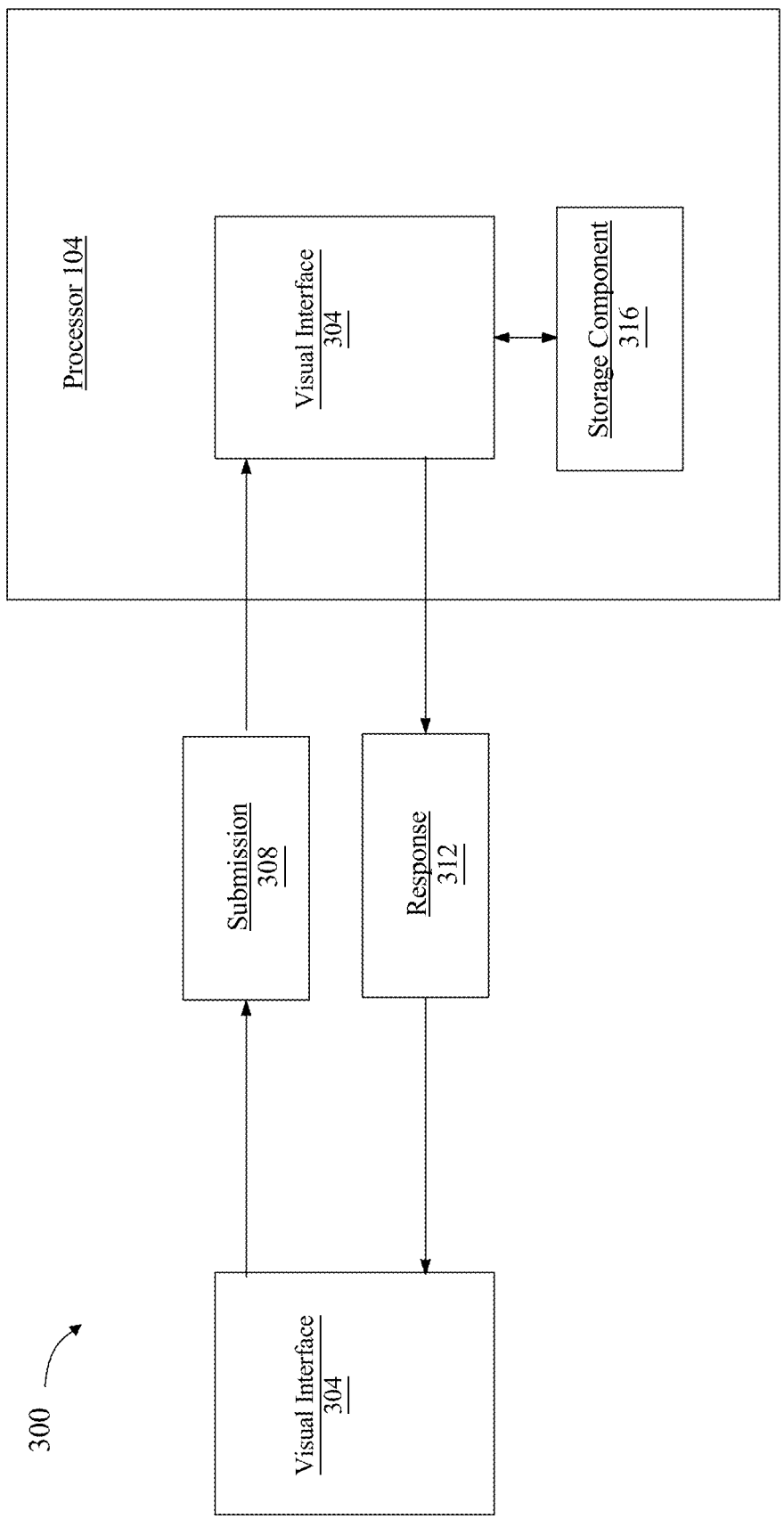
FIG. 3 is a block diagram of an exemplary embodiment of a chatbot.

Referring to FIG. 3, a chatbot system 300 is schematically illustrated. According to some embodiments, a visual interface 304 may be communicative with a processor 104 that is configured to operate a chatbot. In some cases, visual interface 304 may be local to processor 104. Alternatively, or additionally, in some cases, visual interface 304 may remote to processor 104 and communicative with the processor 104, by way of one or more networks, such as without limitation the internet. Alternatively, or additionally, visual interface 304 may communicate with processor 104 using telephonic devices and networks, such as without limitation fax machines, short message service (SMS), or multimedia message service (MMS). Commonly, visual interface 304 communicates with processor 104 using text-based communication, for example without limitation using a character encoding protocol, such as American Standard for Information Interchange (ASCII). Typically, a visual interface 304 conversationally interfaces a chatbot, by way of at least a submission 308, from the user interface 304 to the chatbot, and a response 312, from the chatbot to the visual interface 304. In many cases, one or both submission 308 and response 312 are text-based communication. Alternatively, or additionally, in some cases, one or both of submission 306 and response 312 are audio-based communication.

Continuing in reference to FIG. 3, a submission 308 once received by processor 104 operating a chatbot, may be processed by processor 104. In some embodiments, processor 104 processes a submission 308 using one or more keyword recognition, pattern matching, and natural language processing. In some embodiments, processor employs real-time learning with evolutionary algorithms. In some cases, processor 104 may retrieve a pre-prepared response from at least a storage component 316, based upon submission 308. Storage component 316 may include data store 124 described above. Alternatively, or additionally, in some embodiments, processor 104 communicates a response 312 without first receiving a submission 308, thereby initiating conversation. In some cases, processor 104 communicates an inquiry to visual interface 304; and the processor is configured to process an answer to the inquiry in a following submission 308 from the visual interface 304. In some cases, an answer to an inquiry presents within a submission 308 from entity device described above may be used by processor 104 as an input to another function, for example without limitation generation of conversion record 140.

Figure 4:
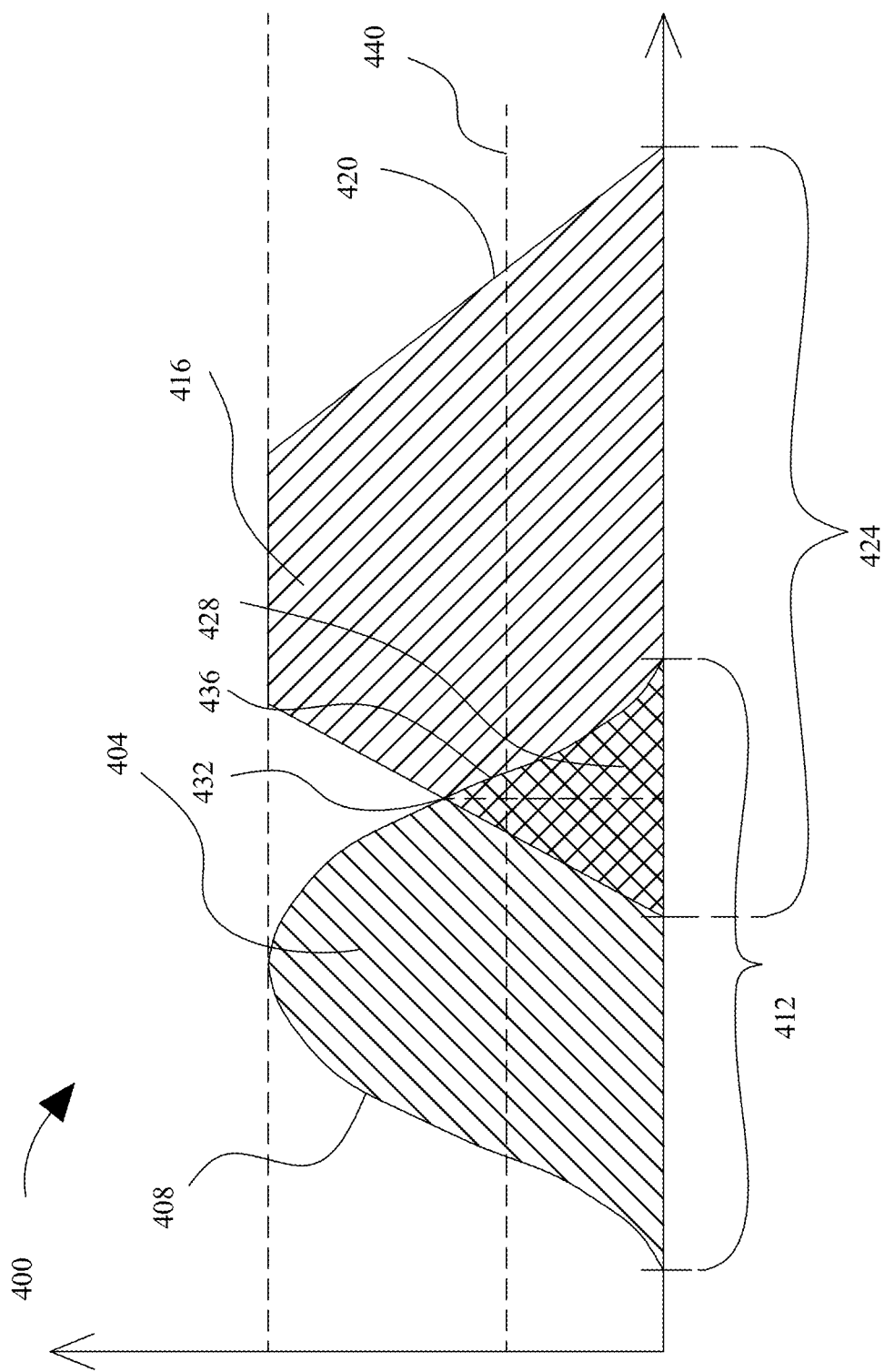
FIG. 4 is a graph illustrating an exemplary relationship between fuzzy sets.

Referring now to FIG. 4, an exemplary embodiment of fuzzy set comparison 400 is illustrated. A first fuzzy set 404 may be represented, without limitation, according to a first membership function 408 representing a probability that an input falling on a first range of values 412 is a member of the first fuzzy set 404, where the first membership function 408 has values on a range of probabilities such as without limitation the interval [0,1], and an area beneath the first membership function 408 may represent a set of values within first fuzzy set 404. Although first range of values 412 is illustrated for clarity in this exemplary depiction as a range on a single number line or axis, first range of values 412 may be defined on two or more dimensions, representing, for instance, a Cartesian product between a plurality of ranges, curves, axes, spaces, dimensions, or the like. First membership function 408 may include any suitable function mapping first range 412 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \frac{x-a}{b-a}, \text{ for } a \leq x < b \\ \frac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

With continued reference to FIG. 4, first fuzzy set 404 may represent any value or combination of values as described above, including output from one or more machine-learning models and/or a predetermined class. A second fuzzy set 416, which may represent any value which may be represented by first fuzzy set 404, may be defined by a second membership function 420 on a second range 424; second range 424 may be identical and/or overlap with first range 412 and/or may be combined with first range via Cartesian product or the like to generate a mapping permitting evaluation overlap of first fuzzy set 404 and second fuzzy set 416. Where first fuzzy set 404 and second fuzzy set 416 have a region 428 that overlaps, first membership function 408 and second membership function 420 may intersect at a point 432 representing a probability, as defined on probability interval, of a match between first fuzzy set 404 and second fuzzy set 416. Alternatively or additionally, a single value of first and/or second fuzzy set may be located at a locus 436 on first range 412 and/or second range 424, where a probability of membership may be taken by evaluation of first membership function 408 and/or second membership function 420 at that range point. A probability at 428 and/or 432 may be compared to a threshold 440 to determine whether a positive match is indicated. Threshold 440 may, in a non-limiting example, represent a degree of match between first fuzzy set 404 and second fuzzy set 416, and/or single values therein with each other or with either set, which is sufficient for purposes of the matching process; for instance, threshold may indicate a sufficient degree of overlap between an output from one or more machine-learning models and/or a predetermined class for combination to occur as described above. Alternatively or additionally, each threshold may be tuned by a machine-learning and/or statistical process, for instance and without limitation as described in further detail below.

With continued reference to FIG. 4, in an embodiment, a degree of match between fuzzy sets may be used to classify any data described as classified above. Where multiple fuzzy matches are performed, degrees of match for each respective fuzzy set may be computed and aggregated through, for instance, addition, averaging, or the like, to determine an overall degree of match.

With continued reference to FIG. 4, in an embodiment, an element of data may be compared to multiple fuzzy sets. For instance, the element of data may be represented by a fuzzy set that is compared to each of the multiple fuzzy sets representing, e.g., values of a linguistic variable; and a degree of overlap exceeding a threshold between the datum-linked fuzzy set and any of the multiple fuzzy sets may cause computing device to classify the datum as belonging to each such categorization. Machine-learning methods as described throughout may, in a non-limiting example, generate coefficients used in fuzzy set equations as described above, such as without limitation x, c, and σ of a Gaussian set as described above, as outputs of machine-learning methods.

With continued reference to FIG. 4, a computing device may use a logic comparison program, such as, but not limited to, a fuzzy logic model to determine an output and/or response. An output and/or response may include, but is not limited to low, medium, advanced, superior, good, bad, and the like; each such output and/or response may be represented as a value for a linguistic variable representing output and/or response or in other words a fuzzy set as described above that corresponds to a degree of completion as calculated using any statistical, machine-learning, or other method that may occur to a person skilled in the art upon reviewing the entirety of this disclosure.

With continued reference to FIG. 4, an inference engine may be implemented according to input and/or output membership functions and/or linguistic variables. For instance, a first linguistic variable may represent a first measurable value pertaining to an element being input to the inferencing system while a second membership function may indicate a degree and/or category of one or more other attributes and/or values that may be associated with a user. Continuing the example, an output linguistic variable may represent, without limitation, a value representing a strength and/or deficiency. An inference engine may combine rules the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Figure 5:
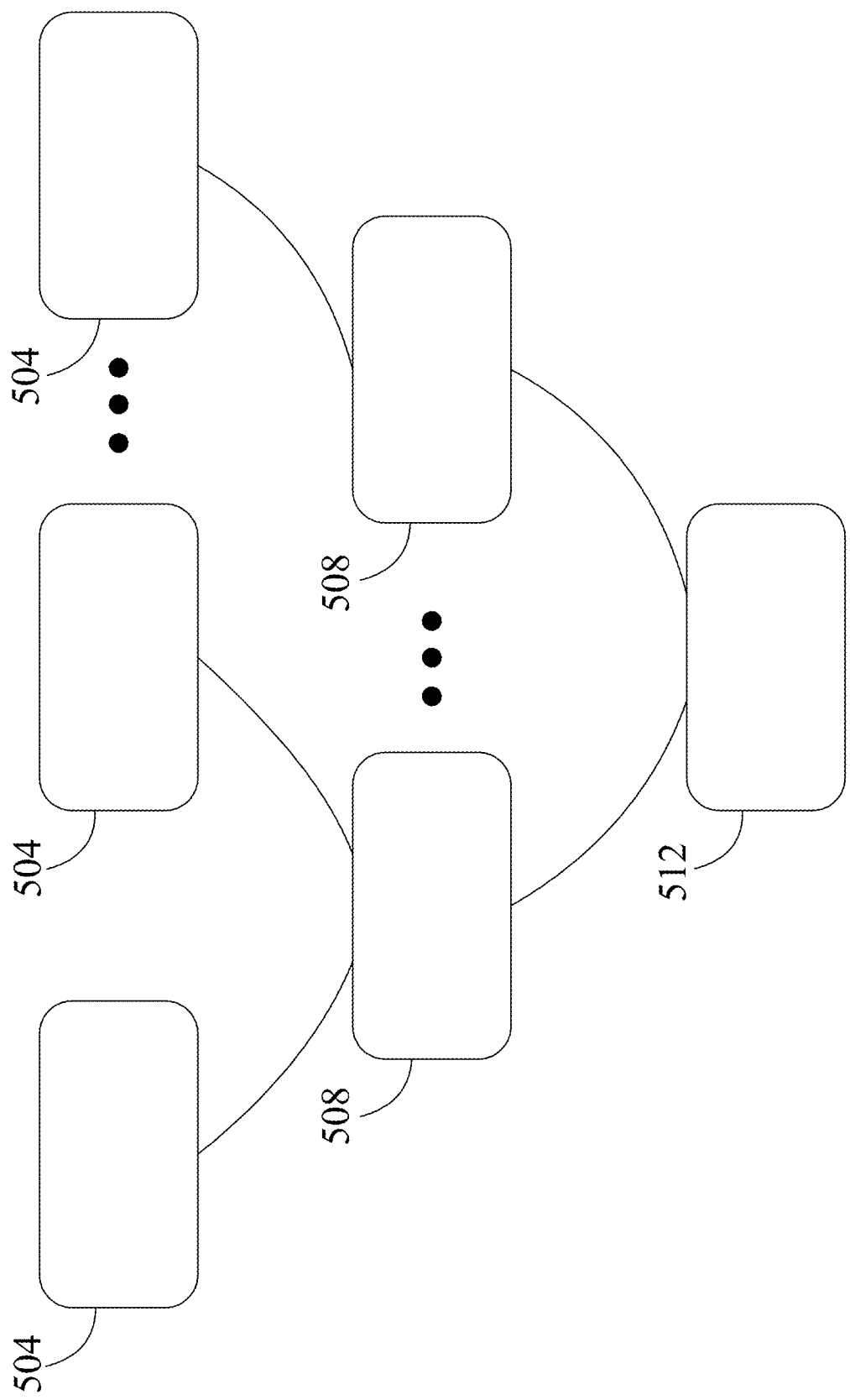
FIG. 5 is an exemplary embodiment of a cryptographic accumulator.

Referring now to FIG. 5, an exemplary embodiment of a cryptographic accumulator 500 is illustrated. A "cryptographic accumulator," as used in this disclosure, is a data structure created by relating a commitment, which may be smaller amount of data that may be referred to as an "accumulator" and/or "root," to a set of elements, such as lots of data and/or collection of data, together with short membership and/or nonmembership proofs for any element in the set. In an embodiment, these proofs may be publicly verifiable against the commitment. An accumulator may be said to be "dynamic" if the commitment and membership proofs can be updated efficiently as elements are added or removed from the set, at unit cost independent of the number of accumulated elements; an accumulator for which this is not the case may be referred to as "static." A membership proof may be referred to as a as a "witness" whereby an element existing in the larger amount of data can be shown to be included in the root, while an element not existing in the larger amount of data can be shown not to be included in the root, where "inclusion" indicates that the included element was a part of the process of generating the root, and therefore was included in the original larger data set. Cryptographic accumulator 500 has a plurality of accumulated elements 504, each accumulated element 504 generated from a lot of the plurality of data lots. Accumulated elements 504 are create using an encryption process, defined for this purpose as a process that renders the lots of data unintelligible from the accumulated elements 504; this may be a one-way process such as a cryptographic hashing process and/or a reversible process such as encryption. Cryptographic accumulator 500 further includes structures and/or processes for conversion of accumulated elements 504 to root 512 element. For instance, and as illustrated for exemplary purposes in FIG. 5, cryptographic accumulator 500 may be implemented as a Merkle tree and/or hash tree, in which each accumulated element 504 created by cryptographically hashing a lot of data. Two or more accumulated elements 504 may be hashed together in a further cryptographic hashing process to produce a node 508 element; a plurality of node 508 elements may be hashed together to form parent nodes 508, and ultimately a set of nodes 508 may be combined and cryptographically hashed to form root 512. Contents of root 512 may thus be determined by contents of nodes 508 used to generate root 512, and consequently by contents of accumulated elements 504, which are determined by contents of lots used to generate accumulated elements 504. As a result of collision resistance and avalanche effects of hashing algorithms, any change in any lot, accumulated element 504, and/or node 508 is virtually certain to cause a change in root 512; thus, it may be computationally infeasible to modify any element of Merkle and/or hash tree without the modification being detectable as generating a different root 512. In an embodiment, any accumulated element 504 and/or all intervening nodes 508 between accumulated element 504 and root 512 may be made available without revealing anything about a lot of data used to generate accumulated element 504; lot of data may be kept secret and/or demonstrated with a secure proof as described below, preventing any unauthorized party from acquiring data in lot.

Alternatively, or additionally, and still referring to FIG. 5, cryptographic accumulator 500 may include a "vector commitment" which may act as an accumulator in which an order of elements in set is preserved in its root 512 and/or commitment. In an embodiment, a vector commitment may be a position binding commitment and can be opened at any position to a unique value with a short proof (sublinear in the length of the vector). A Merkle tree may be seen as a vector commitment with logarithmic size openings. Subvector commitments may include vector commitments where a subset of the vector positions can be opened in a single short proof (sublinear in the size of the subset). Persons skilled in the art, upon reviewing the entirety of this disclosure, will be aware of various alternative or additional cryptographic accumulators 500 that may be used as described herein. In addition to Merkle trees, accumulators may include without limitation RSA accumulators, class group accumulators, and/or bi-linear pairing-based accumulators. Any accumulator may operate using one-way functions that are easy to verify but infeasible to reverse, i.e., given an input it is easy to produce an output of the one-way function but given an output it is computationally infeasible and/or impossible to generate the input that produces the output via the one-way function. For instance, and by way of illustration, a Merkle tree may be based on a hash function as described above. Data elements may be hashed and grouped together. Then, the hashes of those groups may be hashed again and grouped together with the hashes of other groups; this hashing and grouping may continue until only a single hash remains. As a further non-limiting example, RSA and class group accumulators may be based on the fact that it is infeasible to compute an arbitrary root of an element in a cyclic group of unknown order, whereas arbitrary powers of elements are easy to compute. A data element may be added to the accumulator by hashing the data element successively until the hash is a prime number and then taking the accumulator to the power of that prime number. The witness may be the accumulator prior to exponentiation. Bi-linear paring-based accumulators may be based on the infeasibility found in elliptic curve cryptography, namely that finding a number k such that adding P to itself k times results in Q is impractical, whereas confirming that, given 4 points P, Q, R, S, the point, P needs to be added as many times to itself to result in Q as R needs to be added as many times to itself to result in S, can be computed efficiently for certain elliptic curves.

Figure 6:
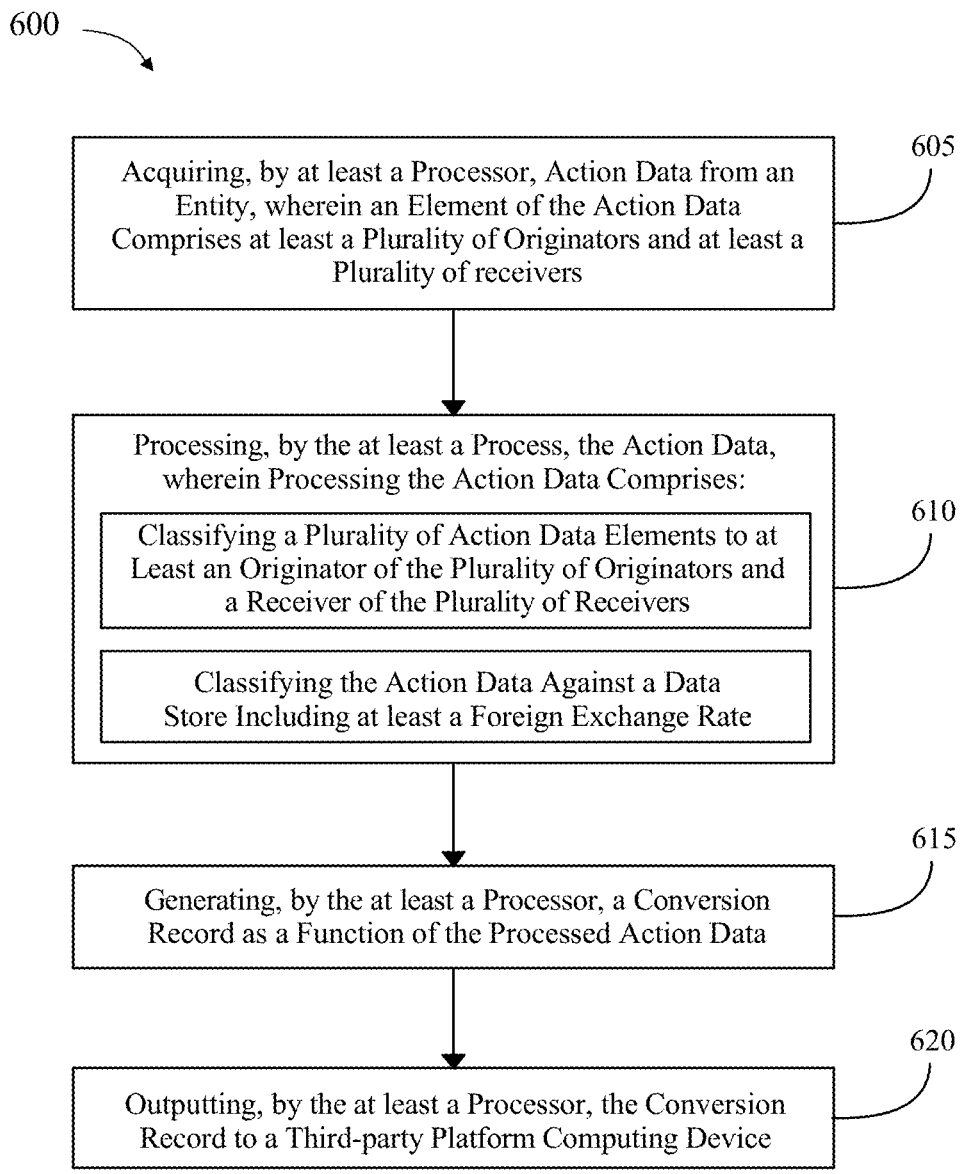
FIG. 6 is a flow diagram illustrating a method of calculating foreign exchange advantages.

Now referring to FIG. 6, a method 600 for calculating foreign exchange advantages is illustrated. Method 600 includes a step 605 of acquiring, by at least a processor, action data from an entity, wherein an element of the action data includes at least a plurality of originators and at least a plurality of receivers. This may be implemented without limitation, as described above in reference to FIGS. 1-5.

With continued reference to FIG. 6, method 600 includes a step 610 of processing, by the at least a processor, the action data, wherein processing the action data includes classifying a plurality of action data elements to at least an originator of the plurality of originators and a receiver of the plurality of receivers and classifying the action data against a data store including at least a foreign exchange rate. This may be implemented without limitation, as described above in reference to FIGS. 1-5. In some embodiments, processing the action data may include processing the action data using an action data machine-learning module.

With continued reference to FIG. 6, method 600 includes a step 615 of generating, by the at least a processor, a conversion record as a function of the processed action data. This may be implemented without limitation, as described above in reference to FIGS. 1-5. In some embodiments, generating conversion record may include constructing a decision tree as a function of the plurality of advantageous threshold requirements, wherein the decision tree may include a plurality of nodes, wherein each node of the plurality of nodes may include at least one advantageous threshold requirement of the plurality of the advantageous threshold requirements, traversing the decision tree based on the action data, and generating the conversion record as a function of the decision tree traversal. In some embodiments, traversing the decision tree may include comparing the action data against the at least one advantageous threshold requirement of the plurality of advantageous threshold requirements at a first node of the plurality of nodes and passing the action data to a second node of the plurality of nodes as a function of the comparison, wherein the second node may be connected to the first node. In some embodiments, traversing the decision tree may include generating a foreign exchange advantage sub-score for each node of the plurality of nodes as a function of each comparison between the action data and the at least one of advantageous threshold requirement occurred at each node of the plurality nodes. In some embodiments, generating the conversion record may include aggregating a plurality of foreign exchange advantage sub-scores associated with the plurality of nodes of the decision tree into a foreign exchange advantage score and generating the conversion record as a function of the foreign exchange advantage score. In some embodiments, aggregating the plurality of foreign exchange advantage sub-scores into the foreign exchange advantage score may include optimizing the foreign exchange advantage score using a linear optimization module. This may be implemented without limitation, as described above in reference to FIGS. 1-5.

With continued reference to FIG. 6, method 600 includes a step 620 of outputting, by the at least a processor, the conversion record to a third-party computing device. This may be implemented without limitation, as described above in reference to FIGS. 1-5. In some embodiments, outputting the conversion record may include sending the conversion record to an end user of the third-party computing device using a chatbot, wherein the third-party platform is connected to the at least a processor via an application programming interface (API). In some embodiments, the chat bot is configured to opt in for an end-user notification containing the conversion record based on an end user request. In other embodiments, the chat bot is configured to opt out for an end-user notification containing the conversion record based on an end-user request. This may be implemented without limitation, as described above in reference to FIGS. 1-5.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 7:
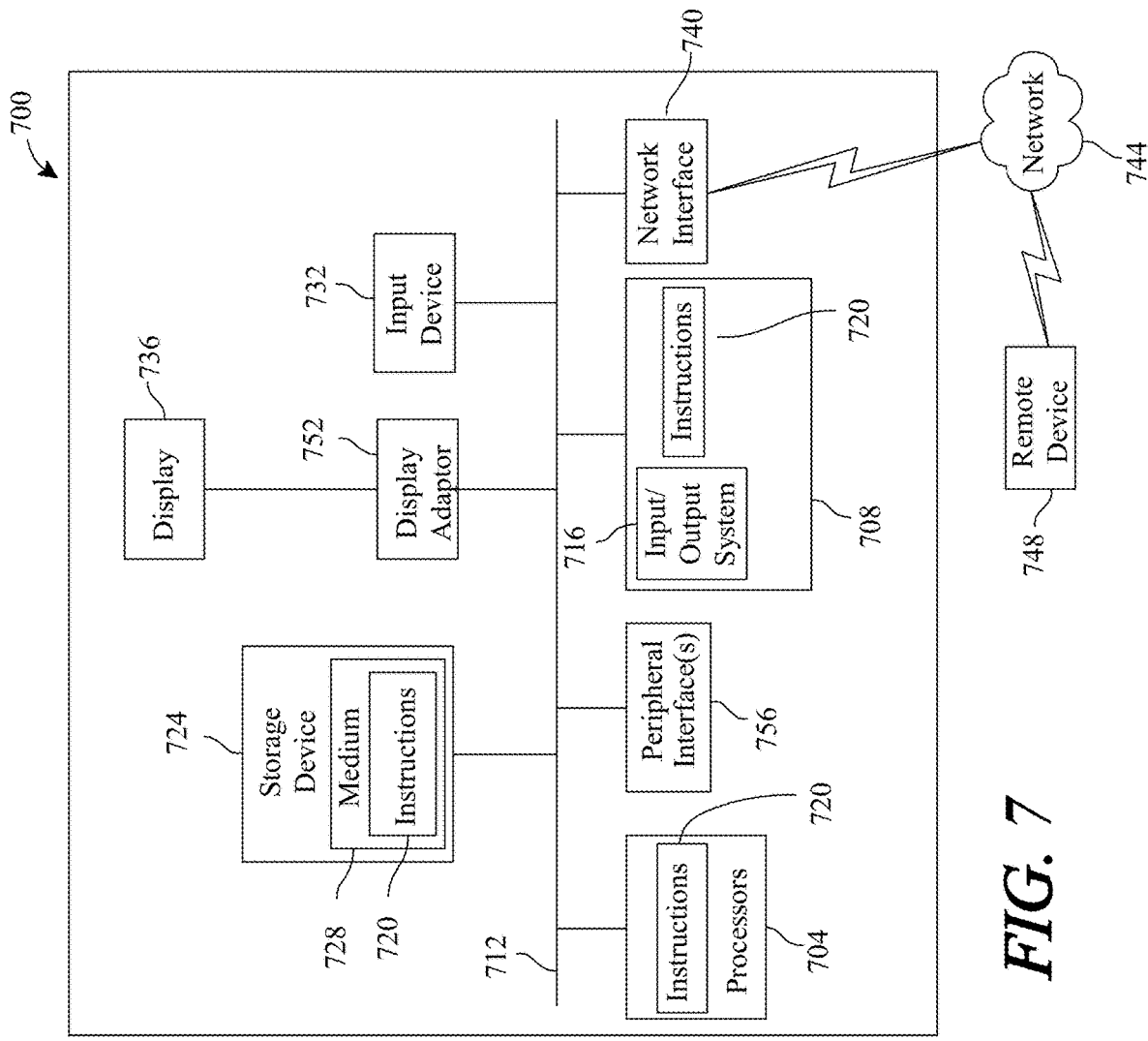
FIG. 7 is a block diagram of a computing system that can be used to implement any one or more of the methodologies disclosed herein and any one or more portions thereof.

FIG. 7 shows a diagrammatic representation of one embodiment of a computing device in the exemplary form of a computer system 700 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Processor 704 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 704 may be organized according to Von Neumann and/or Harvard architecture as a non-limiting example. Processor 704 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 708 may include various components (e.g., machine-readable media) including, but not limited to, a random-access memory component, a read only component, and any combinations thereof. In one example, a basic input/output system 716 (BIOS), including basic routines that help to transfer information between elements within computer system 700, such as during start-up, may be stored in memory 708. Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive, a magnetic disk drive, an optical disc drive in combination with an optical medium, a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above.

A user may also input commands and/or other information to computer system 700 via storage device 724 (e.g., a removable disk drive, a flash drive, etc.) and/or network interface device 740. A network interface device, such as network interface device 740, may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide graphical representations of aspects of the present disclosure. In addition to a display device, computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for calculating foreign exchange optimization, the apparatus comprising:
at least a processor; and
a memory communicatively connected to the processor, the memory containing instructions configuring the at least a processor to:
acquire action data from an entity, wherein an element of the action data comprises:
at least a plurality of originators; and
at least a plurality of receivers;
process the action data comprising a plurality of action data elements, wherein processing the action data comprises:
classifying the plurality of action data elements to at least one originator of the plurality of originators and one receiver of the plurality of receivers, wherein classifying the plurality of action data elements comprises:
training an action data classifier using action training data, wherein the action training data comprises a plurality of action data element sets as input correlated to the plurality of originators and receivers as output; and
classifying the plurality of action data elements to the at least one originator and the one receiver using the trained action data classifier; and
classifying the action data against a data store including at least a foreign exchange rate;
generate a conversion record as a function of the processed action data, wherein generating the conversion record comprises:
constructing a decision tree as a function of a plurality of conversion threshold requirements, wherein:
the decision tree comprises a plurality of nodes; and
each node of the plurality of nodes is a data structure comprising at least one conversion threshold requirement of the plurality of conversion threshold requirements;
generating a foreign exchange score as a function of a decision tree traversal based on the processed action data; and
generating the conversion record as a function of the foreign exchange score; and
output, prior to a foreign exchange transfer, the conversion record to a third-party computing device operated by an end user.

2. The apparatus of claim 1, wherein processing the action data comprises processing the action data using an action data machine-learning module.

3. The apparatus of claim 1, wherein traversing the decision tree comprises:

comparing the processed action data against the at least one conversion threshold requirement of the plurality of conversion threshold requirements at a first node of the plurality of nodes; and
passing the processed action data to a second node of the plurality of nodes as a function of the comparison, wherein the second node is connected to the first node.

4. The apparatus of claim 1, wherein the traversing the decision tree comprises:
generating a foreign exchange advantage sub-score for each node of the plurality of nodes as a function of the processed action data and the at least one conversion threshold requirement associated with each node of the plurality nodes.

5. The apparatus of claim 4, wherein generating the foreign exchange score comprises:
aggregating a plurality of foreign exchange sub-scores associated with the plurality of nodes of the decision tree into the foreign exchange score; and
generating the conversion record as a function of the aggregation of the plurality of foreign exchange sub-scores.

6. The apparatus of claim 5, wherein aggregating the plurality of foreign exchange sub-scores into the foreign exchange score comprises optimizing the foreign exchange score using a linear optimization module.

7. The apparatus of claim 1, wherein outputting the conversion record comprises:
sending the conversion record to the end user using a chatbot, wherein the third-party computing device is connected to the at least a processor via an application programming interface (API).

8. The apparatus of claim 7, wherein the end user, via the chatbot, is opted into an end user notification containing the conversion record based on an end user request.

9. The apparatus of claim 7, wherein the end user, via the chatbot, is opted out of the end user notification containing the conversion record based on an end user request.

10. A method for calculating foreign exchange optimization, the method comprising:
acquiring, by at least one processor, action data from an entity, wherein an element of the action data comprises:
at least a plurality of originators; and
at least a plurality of receivers;
processing, by the at least one processor, the action data comprising a plurality of action data elements, wherein processing the action data comprises:
classifying the plurality of action data elements to at least one originator of the plurality of originators and one receiver of the plurality of receivers, wherein classifying the plurality of action data elements comprises:
training an action data classifier using action training data, wherein the action training data comprises a plurality of action data element sets as input correlated to the plurality of originators and receivers as output; and
classifying the plurality of action data elements to the at least one originator and the one receiver using the trained action data classifier; and
classifying the action data against a data store including at least a foreign exchange rate;
generating, by the at least one processor, a conversion record as a function of the processed action data, wherein generating the conversion record comprises:
constructing a decision tree as a function of a plurality of conversion threshold requirements, wherein:

the decision tree comprises a plurality of nodes; and
each node of the plurality of nodes is a data structure comprising at least one conversion threshold requirement of the plurality of conversion threshold requirements;
generating a foreign exchange score as a function of a decision tree traversal based on the processed action data; and
generating the conversion record as a function of the foreign exchange score; and
outputting, by the at least one processor and prior to a foreign exchange transfer, the conversion record to a third-party computing device operated by an end user.

11. The method of claim 10, wherein processing the action data comprises processing the action data using an action data machine-learning module.

12. The method of claim 10, wherein traversing the decision tree comprises:
comparing the processed action data against the at least one conversion threshold requirement of the plurality of conversion threshold requirements at a first node of the plurality of nodes; and
passing the processed action data to a second node of the plurality of nodes as a function of the comparison, wherein the second node is connected to the first node.

13. The method of claim 10, wherein the traversing the decision tree comprises:
generating a foreign exchange sub-score for each node of the plurality of nodes as a function of the processed action data and the at least one conversion threshold requirement associated with each node of the plurality nodes.

14. The method of claim 13, wherein generating the foreign exchange score comprises:
aggregating a plurality of foreign exchange sub-scores associated with the plurality of nodes of the decision tree into the foreign exchange score; and
generating the conversion record as a function of the aggregation of the plurality of foreign exchange sub-scores.

15. The method of claim 14, wherein aggregating the plurality of foreign exchange sub-scores into the foreign exchange score comprises optimizing the foreign exchange score using a linear optimization module.

16. The method of claim 10, wherein outputting the conversion record comprises:
sending the conversion record to the end user using a chatbot, wherein the third-party computing device is connected to the at least a processor via an application programming interface (API).

17. The method of claim 16, wherein the end user, via the chatbot, is opted into an end user notification containing the conversion record based on an end user request.

18. The method of claim 16, wherein the end user, via the chatbot, is opted out of the end user notification containing the conversion record based on an end user request.

* * * * *